(12) United States Patent
Imashiro et al.

(10) Patent No.: US 9,090,995 B2
(45) Date of Patent: Jul. 28, 2015

(54) PROCESS OF MAKING AN ANTIBACTERIAL NANOFIBER

(71) Applicant: NISSHINBO INDUSTRIES, INC., Tokyo (JP)

(72) Inventors: Yasuo Imashiro, Chiba (JP); Naokazu Sasaki, Chiba (JP); Yukiko Ogushi, Chiba (JP); Mami Iizuka, Chiba (JP)

(73) Assignee: NISSHINBO HOLDINGS, INC., Tokyo (JP)

( * ) Notice: Subject to any disclaimer, the term of this patent is extended or adjusted under 35 U.S.C. 154(b) by 366 days.

(21) Appl. No.: 13/685,417

(22) Filed: Nov. 26, 2012

(65) Prior Publication Data

US 2013/0082424 A1 Apr. 4, 2013

Related U.S. Application Data

(62) Division of application No. 12/594,410, filed as application No. PCT/JP2008/055834 on Mar. 27, 2008, now abandoned.

(30) Foreign Application Priority Data

| Apr. 3, 2007 | (JP) | 2007-096979 |
| Apr. 6, 2007 | (JP) | 2007-100116 |
| Sep. 20, 2007 | (JP) | 2007-243373 |

(51) Int. Cl.
| *D01D 5/08* | (2006.01) |
| *D01D 5/00* | (2006.01) |
| *D01F 6/60* | (2006.01) |
| *D01F 6/62* | (2006.01) |
| *D01F 6/70* | (2006.01) |
| *D04H 1/42* | (2012.01) |
| *D04H 1/4382* | (2012.01) |
| *D04H 3/005* | (2012.01) |
| *D04H 3/016* | (2012.01) |
| *B82Y 40/00* | (2011.01) |

(52) U.S. Cl.
CPC .............. *D01D 5/0007* (2013.01); *D01D 5/003* (2013.01); *D01D 5/0038* (2013.01); *D01F 6/60* (2013.01); *D01F 6/625* (2013.01); *D01F 6/70* (2013.01); *D04H 1/42* (2013.01); *D04H 1/4382* (2013.01); *D04H 3/005* (2013.01); *D04H 3/016* (2013.01); *B82Y 40/00* (2013.01); *Y10S 977/788* (2013.01); *Y10S 977/888* (2013.01); *Y10S 977/903* (2013.01); *Y10T 428/249921* (2015.04); *Y10T 428/298* (2015.01); *Y10T 442/626* (2015.04)

(58) Field of Classification Search
CPC . D01D 5/0007; D01D 5/0015; D01D 5/0023; D01D 5/003; D01D 5/0038; D01D 5/0046; D01D 5/04; D01D 5/06; D01D 5/08
USPC .................. 264/10, 176.1, 464, 465, 466, 484
See application file for complete search history.

(56) References Cited

U.S. PATENT DOCUMENTS

| 4,043,331 | A | 8/1977 | Martin et al. |
| 5,728,461 | A | 3/1998 | Nogata et al. |
| 2006/0204441 | A1* | 9/2006 | Atala et al. ..................... 424/9.6 |
| 2006/0260707 | A1 | 11/2006 | Frey et al. |
| 2006/0264140 | A1* | 11/2006 | Andrady et al. .............. 442/341 |
| 2008/0237934 | A1* | 10/2008 | Reneker et al. ............... 264/464 |
| 2009/0010870 | A1 | 1/2009 | Greiner et al. |
| 2010/0064647 | A1* | 3/2010 | Brands et al. ............. 264/465 X |

FOREIGN PATENT DOCUMENTS

| EP | 1205183 | A2 | 5/2002 |
| EP | 1366791 | A1 | 12/2003 |
| JP | 1991167306 | A | 7/1991 |
| JP | 04-057978 | A | 2/1992 |
| JP | 6002272 | A | 1/1994 |
| JP | 7179694 | A | 7/1995 |
| JP | 9031847 | A | 2/1997 |
| JP | 9286817 | A | 11/1997 |
| JP | 10140472 | A | 5/1998 |
| JP | 11279417 | A | 10/1999 |
| JP | 2000080560 | A | 3/2000 |
| JP | 2000248422 | A | 9/2000 |
| JP | 2001040527 | A | 2/2001 |
| JP | 2002069747 | A | 3/2002 |
| JP | 2005-036376 | A | 2/2005 |
| JP | 2006501373 | A | 1/2006 |

(Continued)

OTHER PUBLICATIONS

Japanese Office Action dated Jan. 28, 2014, issued in corresponding Japanese Patent Application No. 2013-103696 (3 pages).
Lee K. H. et al., " Characterization of nano-structured poly(@?-caprolactone) nonwonen mats via electrospinning"Polymer, Elsevier Science Publishers B. V., GB, vol. 44, No. 4, Feb. 1, 2003, pp. 1287-1294, XP004401578. cited in Supplementary European Search Report.
Ignatova et al., "Electrospinning of poly(vinyl pyrrolidone)-iodine complex and poly(ethylene oxide)/poly(vinylpyrrolidone)-iodine complex—a prospective route to antimicrobial wound dressing materials", European Polymer Journal, Pergamon Press Ltd. Oxford, GB. vol. 43, No. 5, Feb. 25, 2007, pp. 1609-1623, XP022055159. cited in Supplementary European Search Report (Continued)

*Primary Examiner* — Leo B Tentoni
(74) *Attorney, Agent, or Firm* — Westerman, Hattori, Daniels & Adrian, LLP

(57) ABSTRACT

Disclosed is an antibacterial nanofiber which comprises a polymer having an electron-withdrawing group and/or an electron-withdrawing atomic group and has an average fiber diameter of not less than 1 nm and less than 1000 nm, wherein the ratio of the binding energy of the minimum unit of the polymer at 25° C. to the binding energy of the electron-withdrawing group and/or the electron-withdrawing atomic group contained in the minimum unit of the polymer at 25° C. is 0.13 or greater. The nanofiber has an antibacterial activity by itself, and therefore can exhibit an antibacterial activity without the need of adding any antibacterial agent.

10 Claims, 6 Drawing Sheets

(56) References Cited

FOREIGN PATENT DOCUMENTS

Figure 1:
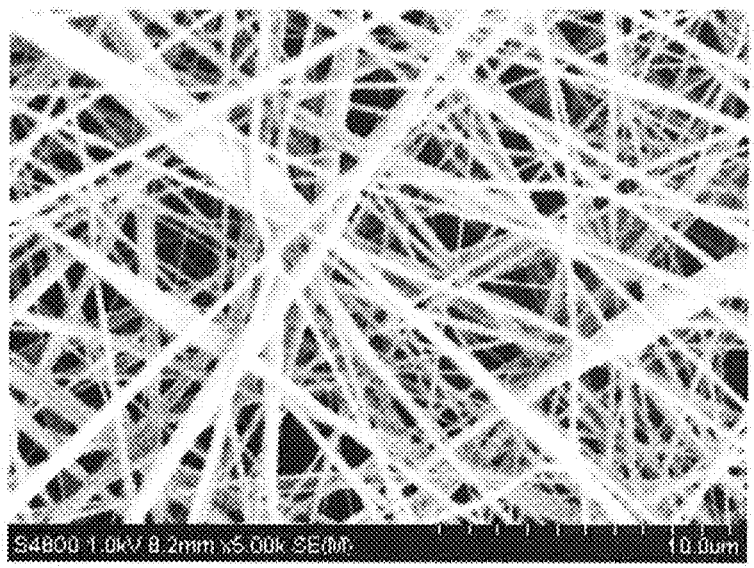

| | | | |
|---|---|---|---|
| JP | 2006133143 A | 5/2006 |
| JP | 2006-341233 A | 12/2006 |
| JP | 2007015202 A | 1/2007 |
| JP | 2008-127496 A | 6/2008 |
| WO | 01049584 A1 | 7/2001 |
| WO | 2006-089531 A2 | 8/2006 |
| WO | 2006-108364 A1 | 10/2006 |

OTHER PUBLICATIONS

Ignatova M. et al. "Electrospun nano-fibre mats with antibacterial properties from quaternised chitosan and poly(vinylalcohol)" Carbohydrate Research, Pergamon, GB, vol. 341, No. 12, Sep. 4, 2006, pp. 2098-2107, XP025010426. cited in Supplementary European Search Report.

Supplementary European Search Report dated May 9, 2011, issued in corresponding European Patent Application No. 08738984.7.

Vancso G J et al. " Transparent Nanocomposites with Ultrathin, electrospun Nylon-4, 6 Fiber Reinforcement"Advanced Materials, Wiley VCH Verlag, DE, vol. 11, No. 16, Nov. 10, 1999, pp. 1362-1365, XP000875155. cited in Supplementary European Search Report.

Son W. K. et al., "Antimicrobial cellulose acetate nanofibers containing silver nanoparticles", Carbohydrate Polymers, Applied Science Publishers, Ltd. Barking, GB, vol. 65, No. 4, Sep. 13, 2006, pp. 430-434, XP025087820. cited in Supplementary European Search Report.

Japanese Office Action dated Feb. 1, 2012, issued in corresponding Japanese Patent Application No. 2007-243373.

Japanese Office Action dated Apr. 4, 2012, issued in corresponding Japanese Patent Application No. 2007-243373 (2 pages).

International Search Report of PCT/JP2008/055834, Mailing Date of Jun. 24, 2008.

\* cited by examiner

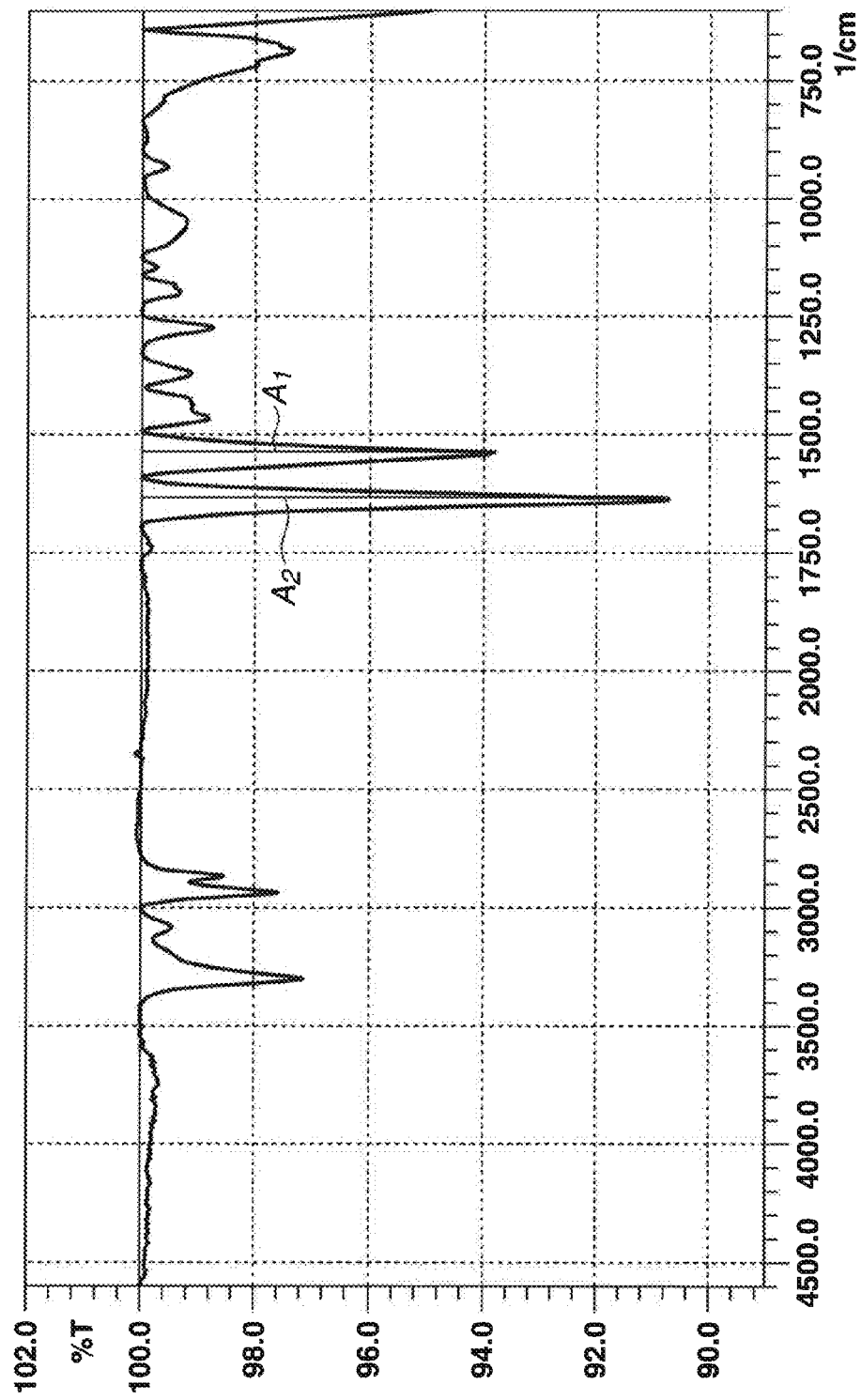

PROCESS OF MAKING AN ANTIBACTERIAL NANOFIBER

CROSS-REFERENCE TO RELATED APPLICATION

This application is a Divisional of application Ser. No. 12/594,410, filed Oct. 2, 2009, now abandoned, which is National Stage of copending PCT International Application No. PCT/JP2008/055834 filed on Mar. 27, 2008. The entire content of each of the above documents is hereby incorporated by reference into the present application.

TECHNICAL FIELD

The present invention relates to an antibacterial nanofiber. More specifically, the invention relates to a nanofiber which has in itself an antibacterial ability, and is capable of exhibiting antibacterial properties even without the addition of an antibacterial agent.

BACKGROUND ART

Antibacterially finished textile products and shaped plastics have attracted attention in recent years. For example, garments, medical supplies and household goods conferred with antibacterial properties are currently available on the market.

Various resins, including polyamides (see Patent Documents 1, 2 and 4), polyacrylonitriles (see Patent Documents 3 to 5), polyesters (see Patent Document 4), polylactic acids (see Patent Document 6), polyvinylidene chlorides (see Patent Documents 7 and 8), and polystyrenes (see Patent Documents 8 to 11), are used as the resins making up such antibacterial products.

In these prior-art antibacterial products, an antibacterial finish is required to confer antibacterial properties to the resin.

Antibacterial substances used for such antibacterial finishing have generally included, for example: inorganic antibacterial agents containing metal ions such as copper, silver or zinc; or organic antibacterial agents such as benzalkonium chloride, organosilicon compounds or quaternary ammonium salts.

However, a drawback of inorganic antibacterial agents is that, when added to plastics, the influence of heat during the molding process or light irradiation deforms the plastic, markedly lowering the value of the product. Drawbacks of organic antibacterial agents include poor weather and chemical resistance, and a high acute oral toxicity.

In addition, the art of Patent Document 1 requires a polymer alloy preparation step, a melt-spinning step for obtaining polymer alloy fibers, and a step for removing the sea component from the polymer alloy fibers. These production steps are very complicated.

The nanofiber of Patent Document 2 can be obtained by electrostatic spinning, and so the step of manufacturing the fiber itself is simple. However, here too, a photocatalyst supporting step is separately required in order to achieve antibacterial and deodorizing effects.

Likewise, in the other antibacterial products in Patent Documents 3 to 11, a separate step involving the application of an antibacterial agent to fibers, particles, a sheet or the like is required.

Hence, in each of the prior-art disclosures, an antibacterial agent or photocatalyst conferring step that is separate from the fiber or film-forming steps is essential, which takes time, effort and cost.

Patent Documents 12 and 13 address this problem by disclosing a polylactic acid fiber which itself has antibacterial properties even without the addition of an antibacterial agent.

However, the antibacterial properties of these polylactic acid fibers are presumably due to the lactic acid monomer which is present at the surface of the micron order fibers, and thus similarly entail the addition of an antibacterial ingredient to fibers.

At the same time, textile products composed of polyurethane fibers have been widely used in hygiene products and the like.

For example, Patent Document 14 (U.S. Pat. No. 4,043,331) discloses an emergency wound dressing composed of polyurethane fibers which have a fiber diameter of from 0.1 to 25 μm and are obtained by electrostatic spinning.

Patent Document 15 (JP-A 2006-501373) discloses a nonwoven fiber assembly which includes aliphatic polyether polyurethane fibers with a fiber diameter of from 3 to 3,000 nm obtained by an electrostatic spinning process, and which is suitable in hygiene products such as medical dressings.

However, even in hygiene products composed of such polyurethane fibers, because the fibers themselves do not have antibacterial properties, when used, they must be treated with disinfectants at the point of care. Moreover, measures for maintaining a sterile state are required during storage as well.

Therefore, although the imparting of antibacterial properties is being carried out, as with the various types of resins mentioned above, conferring fibers with an antibacterial ability takes time, effort and cost.

Patent Document 1: JP-A 2005-36376
Patent Document 2: JP-A 2007-15202
Patent Document 3: JP-A 6-2272
Patent Document 4: JP-A 9-31847
Patent Document 5: JP-A 9-286817
Patent Document 6: JP-A 2000-248422
Patent Document 7: JP-A 11-279417
Patent Document 8: JP-A 2002-69747
Patent Document 9: JP-A 7-179694
Patent Document 10: JP-A 10-140472
Patent Document 11: JP-A 12-80560
Patent Document 12: JP-A 2001-40527
Patent Document 13: International Disclosure WO 2001/049584
Patent Document 14: U.S. Pat. No. 4,043,331
Patent Document 15: JP-A 2006-501373

DISCLOSURE OF THE INVENTION

Problems to be Solved by the Invention

It is therefore an object of the present invention to provide an antibacterial nanofiber which in itself has an antibacterial ability, and is capable of exhibiting antibacterial properties even without the addition of an antibacterial agent.

Means for Solving the Problems

The inventors have conducted extensive investigations in order to achieve the above objects. As a result, they have discovered that, in a fiber composed of a polymer having electron-withdrawing groups and/or electron-withdrawing atomic groups, by setting the bond energy of electron-withdrawing groups and/or electron-withdrawing atomic groups in the smallest unit of the polymer relative to the bond energy of the smallest unit of the polymer in a specific range and by setting the average fiber diameter within the nanofiber range of at least 1 nm but less than 1,000 nm, the fiber itself exhibits an excellent antibacterial ability.

Accordingly, the present invention provides:
1. An antibacterial nanofiber composed of a polymer possessing electron-withdrawing groups and/or electron-withdrawing atomic groups, which polymer has a ratio of the bond energy at 25° C. of electron-withdrawing groups and/or electron-withdrawing atomic groups present in a smallest unit of the polymer to the bond energy at 25° C. of the smallest unit of the polymer of at least 0.13, wherein the nanofiber has an average fiber diameter of at least 1 nm but less than 1,000 nm;
2. The antibacterial nanofiber of 1 wherein, in surface functional group measurement using an acid-base titration method, the ratio of functional groups in a specific weight of the nanofiber to functional groups in film of the same weight that is formed of the polymer is at least 1.3;
3. The antibacterial nanofiber of 1 or 2 which is composed solely of the polymer having electron-withdrawing groups and/or electron-withdrawing atomic groups;
4. The antibacterial nanofiber of any one of 1 to 3, wherein the polymer is a polyester resin, a polyamide resin, a polyurethane resin, a polyacrylonitrile resin, a polyamideimide resin, a polyvinyl chloride resin or a polystyrene resin;
5. The antibacterial nanofiber of 4, wherein the polymer is a water-insoluble polymer;
6. The antibacterial nanofiber of 4, wherein the polyurethane resin is an ester-type polyurethane resin;
7. The antibacterial nanofiber of 6, wherein the average fiber diameter is from 1 to 300 nm;
8. The antibacterial nanofiber of 4 wherein the polyamide resin has, in an infrared absorption spectrum thereof, a ratio $A_2/A_1$ between the height $A_1$ of a peak near 1550 cm$^{-1}$ and the height $A_2$ of a peak near 1640 cm$^{-1}$ of from 1.2 to 1.8; 9. The antibacterial nanofiber of 8 wherein the ratio $A_2/A_1$ is from 1.3 to 1.6;
10. The antibacterial nanofiber of any one of 1 to 9 which is obtained by electrostatic spinning;
11. The antibacterial nanofiber of 8 which is obtained by electrostatically spinning a solution prepared by dissolving the polyamide resin in formic acid;
12. The antibacterial nanofiber of any one of 1 to 11 for use in antibacterial textile products;
13. A textile material composed of the antibacterial nanofibers of any one of 1 to 11;
14. The textile material of 13 which includes no antibacterial agent other than antibacterial nanofibers;
15. A textile material which is composed solely of the antibacterial nanofibers of any one of claims 1 to 11;
16. The textile material of any one of 13 to 15 which is a nonwoven fabric;
17. A method of manufacturing antibacterial nanofibers, the method including the step of spinning, by an electrostatic spinning process, a solution prepared by dissolving a polymer having electron-withdrawing groups and/or electron-withdrawing atomic groups in an organic solvent; and
18. The method of manufacturing antibacterial nanofibers of 17, wherein the polymer having electron-withdrawing groups and/or electron-withdrawing atomic groups is a polyamide resin, and the organic solvent is formic acid.

Advantageous Effects of the Invention

Because the nanofiber of the present invention has in itself an antibacterial ability, there is no need for a separate antibacterial finish.

Therefore, the inventive nanofibers and textile materials made thereof do not require the use of chemicals such as antibacterial agents, making them safe even for use in garments and hygiene products that come into direct contact with the skin.

Moreover, medical dressings made with the nanofibers of the invention can be stored in a sterile state without including therein disinfectant or antibacterial compounds, as a result of which such dressings are easy to handle during use and storage.

BRIEF DESCRIPTION OF THE DIAGRAMS

Figure 2:
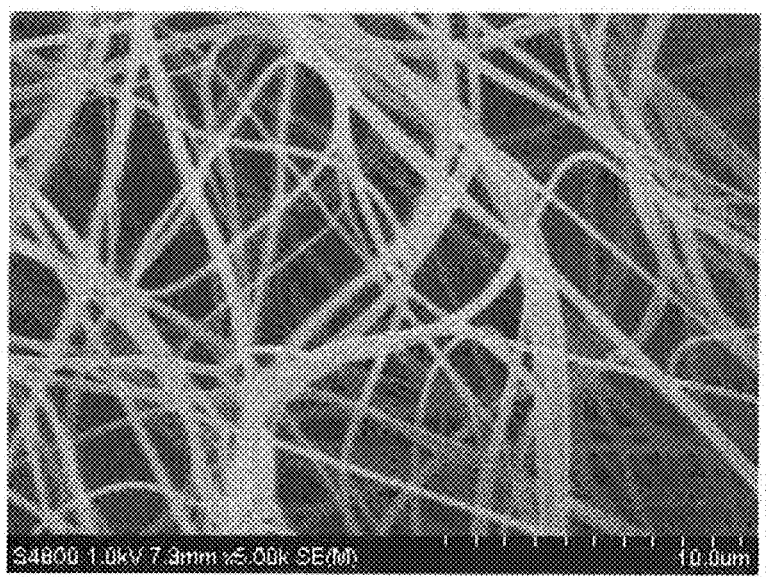
Figure 3:
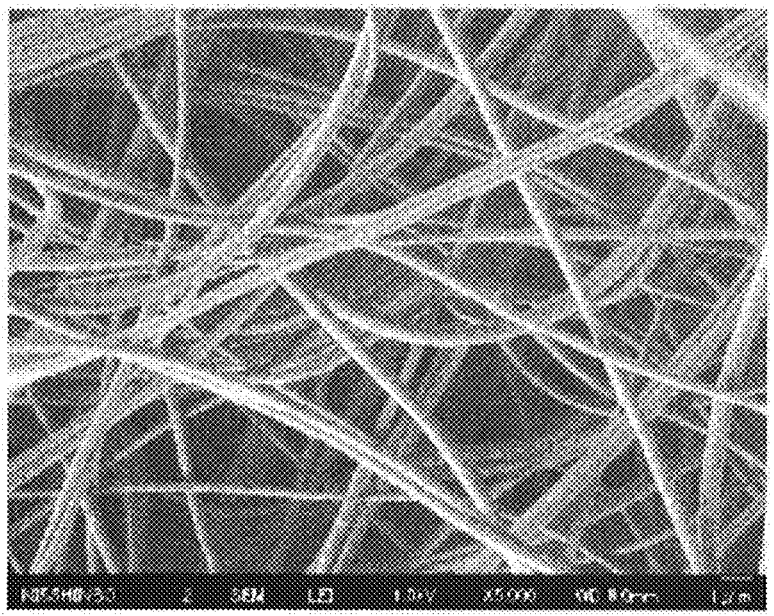
Figure 4:
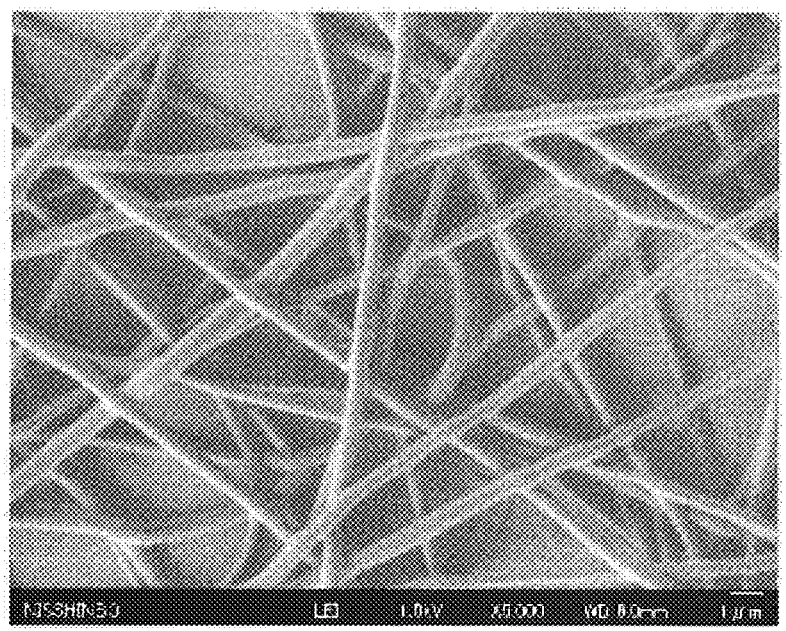
Figure 5:
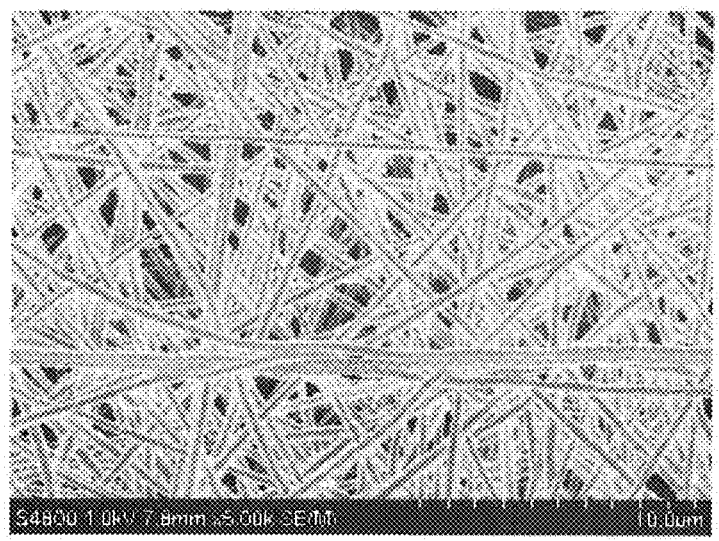
Figure 6:
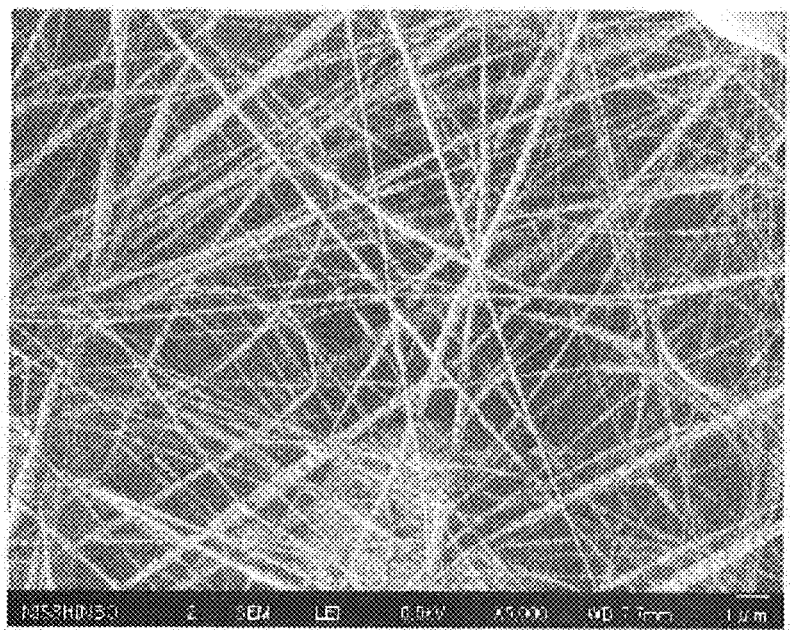
Figure 7:
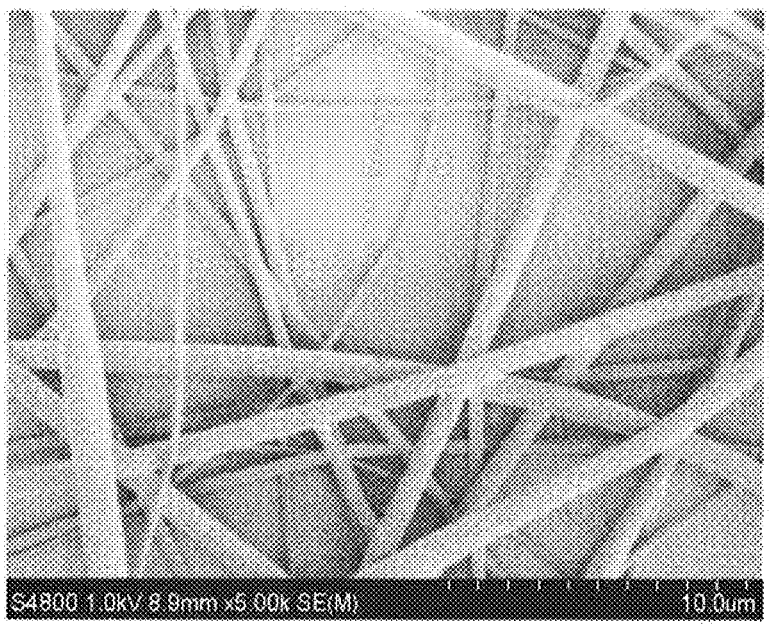
Figure 8:
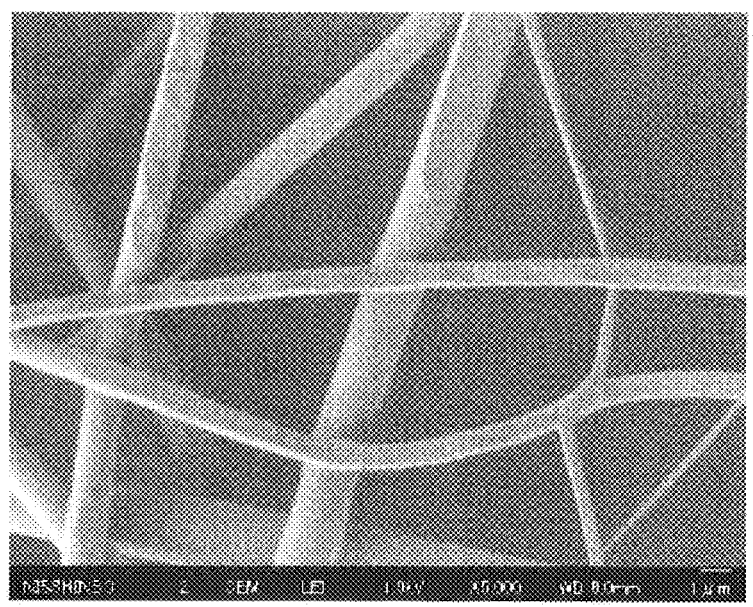
Figure 9:
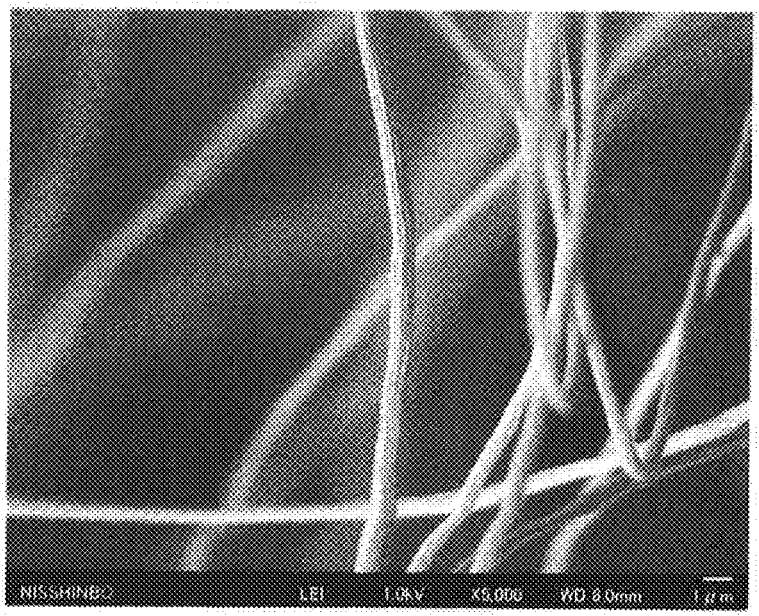

FIG. 1 is an electron micrograph of the nanofiber nonwoven fabric obtained in Example 1.
FIG. 2 is an electron micrograph of the nanofiber nonwoven fabric obtained in Example 4.
FIG. 3 is an electron micrograph of the nanofiber nonwoven fabric obtained in Example 7.
FIG. 4 is an electron micrograph of the nanofiber nonwoven fabric obtained in Example 11.
FIG. 5 is an electron micrograph of the nanofiber nonwoven fabric obtained in Example 12.
FIG. 6 is an electron micrograph of the nanofiber nonwoven fabric obtained in Example 21.
FIG. 7 is an electron micrograph of the nanofiber nonwoven fabric obtained in Example 22.
FIG. 8 is an electron micrograph of the nanofiber nonwoven fabric obtained in Example 23.
FIG. 9 is an electron micrograph of the nanofiber nonwoven fabric obtained in Example 24.
FIG. 10 shows an infrared absorption spectrum of the nonwoven fabric obtained in Example 4.

BEST MODE FOR CARRYING OUT THE INVENTION

The invention is described more fully below.

The antibacterial nanofiber according to the present invention is composed of a polymer possessing electron-withdrawing groups and/or electron-withdrawing atomic groups, which polymer has a ratio of the bond energy at 25° C. of electron-withdrawing groups and/or electron-withdrawing atomic groups present in a smallest unit of the polymer to the bond energy at 25° C. of the smallest unit of the polymer of at least 0.13. The nanofiber has an average fiber diameter of at least 1 nm but less than 1,000 nm.

As used herein, "electron-withdrawing" refers to the quality of reducing the electron density at a specific position on a molecule. In the present invention, "electron-withdrawing group" denotes a substituent which has such a quality, and "electron-withdrawing atomic group" denotes an atomic group which constructs the polymer backbone and has such a quality.

This electron-withdrawing property results from the combined action of, for example, an inductive effect (I effect) and a mesomeric effect (M effect), and manifests in a way that varies with the presence of a conjugated system (aromatic ring) and the topology of substituents. In the present invention, the polymer may be any having substituents or atomic groups which exhibit electron-withdrawing properties due to an inductive effect (-I effect), substituents or atomic groups which exhibit electron-withdrawing properties due to a mesomeric effect (-M effect), or substituents or atomic groups which exhibit electron-withdrawing properties due to a composite effect thereof.

Examples of such electron-withdrawing substituents and atomic groups include aldehydes, amides, urethanes, ketones (carbonyl), thio, thioesters, carboxylic acids (carboxyl), carboxylic acid esters, carboxylic acid anhydrides, nitriles (cyano), nitro, halogens (fluorine, chlorine, bromine, iodine), amines (amino), sulfonyl, isocyanates, carbodiimides, formyl, aryls (phenyl, phenylene, biphenylene, naphthylene, anthrylene, etc.), heteroaryls (pyrrolyl, thiophenyl, pyridyl, etc.), ethylene (vinyl), acetylenes, azo, hydrazino, hydrazides and imides.

The polymer making up the nanofiber of the invention has a ratio of the bond energy at 25° C. of electron-withdrawing groups and/or electron-withdrawing atomic groups present in a smallest unit of the polymer to the bond energy at 25° C. of the smallest unit of the polymer of at least 0.13.

Here, "bond energy" refers to the energy, apportioned among the respective covalent bonds in a molecule, that is required to break those bonds. In a diatomic molecule, the bond energy can be directly determined from the heat of dissociation (heat of atomization). However, in a polyatomic molecule, although the overall heat of dissociation can be determined, the dissociation energy for each individual bond varies depending on such factors as the molecular structure, and therefore cannot be easily determined. Accordingly, in polyatomic molecules having similar bonds, for the sake of convenience, an average is taken of the individual bond dissociation energies, and this average is treated as the bond energy. In the present invention, "bond energy" refers to this average value of the various bond dissociation energies. Table 1 shows the bond energies of common covalent bonds.

TABLE 1

| Bond | Bond energy (kJ/mol, 25° C.) |
| --- | --- |
| C—O | 329 |
| C=O (CO2) | 804 |
| C=C | 588 |
| C=S (CS2) | 578 |
| C—C | 357 |
| C—H (CH4) | 416 |
| C—N (CH3NH2) | 273 |
| C—I (CI4) | 238 |
| C—Br (CBr4) | 276 |
| C—Cl (CCl4) | 327 |
| C—F (CF4) | 489 |
| N—H (NH3) | 391 |
| N—N | 418 |

Referring to the sum of the bond energies (25° C.) held by electron-withdrawing groups (electron-withdrawing atomic groups) present in a smallest unit structure of the polymer as the "bond energy of electron-withdrawing groups" and referring to the sum of the bond energies (25° C.) held by the smallest unit structure of the polymer as the "total bond energy," the bond energy ratio in this invention is calculated as the (bond energy of electron-withdrawing groups)/(total bond energy).

When this bond energy ratio is less than 0.13, the fiber itself ceases to exhibit antibacterial properties. As for an upper limit, so long as the bond energy ratio is at least 0.13, the fiber itself will exhibit antibacterial properties. The bond energy ratio can be suitably adjusted by, for example, introducing a plurality of electron-withdrawing substituents onto the polymer; hence, there is no particular upper limit in this value (provided it is less than 1). Taking into overall account the antibacterial effects, polymer production costs and other considerations, an upper limit of 0.8 or below is preferred.

The antibacterial nanofiber of the present invention has an average fiber diameter in the nanofiber range of at least 1 nm but less than 1,000 nm. To achieve higher antibacterial properties, the upper limit is preferably 800 nm or less, more preferably 600 nm or less, and even more preferably 500 nm or less. The lower limit, although not subject to any particular limitation provided it is at least 1 nm, is preferably at least 10 nm, and more preferably at least 50 nm.

Also, in this invention, in surface functional group measurement using an acid-base titration method, the ratio of functional groups in a specific weight of the nanofiber to functional groups in a film of the same weight that is formed of the polymer making up the nanofiber is preferably at least 1.3, and more preferably at least 1.5.

Nanofiber which satisfies such a condition has many functional groups on the fiber surface, and thus is capable of exhibiting better antibacterial properties.

Illustrative, non-limiting, examples of the polymer having electron-withdrawing groups and/or electron-withdrawing atomic groups which makes up the nanofiber of the invention include polyester resins, polyamide resins, polyurethane resins, polyacrylonitrile resins, polyamideimide resins, polyacrylic acid resins, polyvinyl chloride resins, polystyrene resins, polyimides, polyallylates, polyanilines, polypyrroles, and polythiophenes. A water-insoluble polymer is especially preferred.

(1) Polyester Resins

The polyester resins are not subject to any particular limitation; use may be made of various types of hitherto known polyester resins. However, in the present invention, it is preferable to use what are commonly referred to as "biodegradable plastics"—that is, aliphatic polyesters such as polylactic acid-type aliphatic polyesters, polycaprolactone-type aliphatic polyesters, microbially produced aliphatic polyesters, polyhydroxyalkanoates and polybutylene succinates.

Polylactic acid-type aliphatic polyesters are exemplified by polylactides, including polymers of oxy acids such as lactic acid, malic acid and glycolic acid, and copolymers thereof. Specific examples include polylactic acid, poly(α-malic acid), polyglycolic acid, and glycolic acid-lactic acid copolymers. Hydroxycarboxylic acid-type aliphatic polyesters such as polylactic acid are especially preferred.

Polycaprolactone-type aliphatic polyesters can be obtained by the ring-opening polymerization of ε-caprolactone. Although water-insoluble polymers, they are degraded by many bacteria, and are aliphatic polyesters represented by the general formula —(O(CH$_2$)$_5$CO)$_n$—. Commercial polycaprolactone-type aliphatic polyesters are exemplified by Tone (trade name), available from Nippon Unicar Co., Ltd.

Microbially produced polyesters are thermoplastic polymers of biological origin which have a melting point. Illustrative examples include polyhydroxybutyrate (PHB), poly (hydroxybutyric acid-hydroxypropionic acid) copolymers and poly(hydroxybutyric acid-hydroxyvaleric acid) copolymers.

(2) Polyamide Resins

Illustrative examples of polyamide resins include those obtained by the polycondensation or copolycondensation of an aminocarboxylic acid, a lactam or a diamine with a dicarboxylic acid, such as nylon 6, nylon 11, nylon 12, nylon 66, nylon 610, nylon 46, nylon 6T, nylon 6I, nylon 9T, nylon M5T and nylon 612; and para-type wholly aromatic polyamides and meta-type wholly aromatic polyamides obtained by copolymerizing an aromatic diamine with a dicarboxylic acid.

When a polyamide resin is used, the resin has, in an infrared absorption spectrum thereof, a ratio $A_2/A_1$ between the height $A_1$ of a peak near 1550 cm$^{-1}$ and the height $A_2$ of a peak near 1640 cm$^{-1}$ of preferably from 1.2 to 1.8, more preferably from 1.2 to 1.6, and even more preferably from 1.3 to 1.6.

By using such a polyamide resin, the antibacterial properties of the nanofiber can be increased even further.

(3) Polyurethane Resin

The polyurethane resin is not subject to any particular limitation. Various types of known polyurethane resins may be used. However, to have a larger number of electron-withdrawing groups (atomic groups) present within the molecule, an ether-type polyurethane resin or an ester-type polyurethane resin is preferred. An ester-type polyurethane resin is especially preferred.

The ether-type polyurethane resin may be any which has ether bonds on the molecule. Use may be made of an ether-type polyurethane resin obtained from an ether bond-containing polymeric diol and an organic diisocyanate as the starting materials.

The ester-type polyurethane resin may be any which has ester bonds on the molecule. Use may be made of an ester-type polyurethane resin obtained from an ester bond-containing polymeric diol and an organic diisocyanate as the starting materials.

In cases where an ester-type polyurethane resin is used, the antimicrobial properties can be further increased by setting the average diameter of the nanofiber to 300 nm or less.

Illustrative examples of ether bond-containing polymeric diols include polytetramethylene glycol, polyethylene glycol, polypropylene glycol, polyoxyethylene glycol, polyoxypropylene glycol, and random and block copolymers of ethylene oxide and polypropylene oxide. These polymeric diols may be used singly or as combinations of two or more.

Illustrative examples of ester bond-containing polymeric diols include polyester diols obtained by the polycondensation of one or more dibasic acid such as succinic acid, malonic acid, glutaric acid, adipic acid, sebacic acid, maleic acid, itaconic acid or azelaic acid with one or more glycol such as ethylene glycol, propylene glycol, hexamethylene glycol, diethylene glycol, 1,2-propanediol, 1,3-butanediol, 1,4-butanediol, 1,5-pentanediol, 1,6-hexanediol, silicone diol, neopentyl glycol, neopentylene glycol, 3-methyl-1,5-pentanediol, 1,3-dimethylolcyclohexane and 1,4-dimethylolcyclohexane; polylactone diols obtained by the ring-opening polymerization of lactones such as ε-caprolactone and valerolactone, e.g., poly-ε-caprolactone diol and polyvalerolactone diol; polycarbonate diols obtained by a transesterification reaction between one or more organic carbonate, such as a dialkyl carbonate (e.g., dimethyl carbonate, diethyl carbonate), an alkylene carbonate (e.g., ethylene carbonate, propylene carbonate) or a diaryl carbonate (e.g., diphenyl carbonate, dinaphthyl carbonate), and one or more aliphatic diol such as ethylene glycol, propylene glycol, 1,4-butanediol, 1,5-pentanediol, neopentyl glycol, 1,6-hexanediol or 3-methyl-1,5-pentanediol; and polyether ester diols. These polymeric diols may be used singly or as combinations of two or more thereof.

Of the above polymeric diols, polyester diols obtained by the polycondensation of a dibasic acid and a glycol are preferred.

In the present invention, the polymeric diol has a number-average molecular weight which, while not subject to any particular limitation, is preferably from 400 to 5,000, and more preferably from 800 to 3,500. The number-average molecular weight can be calculated from the hydroxyl value in accordance with JIS K 1557. For example, when the hydroxyl value is 280.5 mg KOH/g, the number-average molecular weight is 400; when the hydroxyl value is 22.44 mg KOH/g, the number-average molecular weight is 5,000.

The organic diisocyanate used here may be any known aliphatic, alicyclic or aromatic diisocyanate which dissolves or exhibits a liquid state under the reaction conditions. Illustrative examples of such diisocyanates include 4,4'-diphenylmethane diisocyanate (MDI), 2,4-tolylene diisocyanate (TDI), hexamethylene diisocyanate (HDI), 1,5-naphthalene diisocyanate, xylylene diisocyanate (XDI), hydrogenated xylylene diisocyanate, isophorone diisocyanate, 1,4-phenylene diisocyanate, 1,4-cyclohexane diisocyanate, 4,4'-dicyclohexylmethane diisocyanate (HMDI), 1,6-hexamethylene diisocyanate, m-tetramethylxylene diisocyanate, p-tetramethylxylene diisocyanate and 4,4'-diisocyanato-3,3'-dimethyl-1,1'-biphenyl (TODI). These may be used singly or as combinations of two or more.

Of the above diisocyanates, MDI and HMDI are especially preferred.

The polyurethane resin of the invention may be obtained by a known method. An illustrative example is a technique in which an isocyanate-terminal prepolymer prepared from the above-described polymeric diol and organic diisocyanate is reacted, in the presence or absence of a solvent, with a polyfunctional, active hydrogen atom-bearing chain extender and, if necessary, a monofunctional, active hydrogen atom-bearing end-capping agent.

Here, the organic diisocyanate is used in an excess of, expressed as a molar ratio with respect to the polymeric diol, preferably from about 1.2- to about 3.5-fold, and more preferably from about 1.5- to about 2.5-fold.

The polyfunctional, active hydrogen atom-bearing chain extender which may be used in the above reaction is exemplified by compounds such as low-molecular-weight diols, low-molecular-weight diamines and water which have two active hydrogen atoms and are capable of reacting with an organic diisocyanate. Using a low-molecular-weight compound having a molecular weight of 500 or less is especially desirable because the resulting polyurethane can be conferred with a suitable heat resistance.

In the present invention, the amount of chain extender used is the amount necessary to cap the excess organic diisocyanate, and is most preferably set to from 0.8 to 1.3 equivalent percent. At less than 0.8 equivalent percent, the excess organic diisocyanate may react over time, possibly inviting an increase in the molecular weight and a marked rise in solution viscosity. On the other hand at above 1.3 equivalent percent, the addition of excess chain extender may give rise to yellowing, or lead to a decline over time in the viscosity.

Here, the low-molecular-weight diol is exemplified by aliphatic diols such as ethylene glycol, propylene glycol, 1,4-butanediol, 1,5-pentanediol, neopentyl glycol, 1,6-hexanediol and 3-methyl-1,5-pentanediol. These may be used singly or as combinations of two or more.

Of the above, from the standpoint of workability and to impart suitable properties to the fiber to be obtained, ethylene glycol, 1,4-butanediol, 1,5-pentanediol and 1,6-hexanediol are preferred. From the standpoint of reactivity and the properties of the polyurethane to be obtained, the combined use of 1,5-pentanediol and 1,6-hexanediol is more preferred.

When 1,5-pentanediol and 1,6-hexanediol are used together, these are used in an amount which is set to preferably from 5 to 50 wt %, and more preferably from 10 to 30 wt %, based on the total weight of the low-molecular-weight diol. At less than 5 wt %, polyurethane having sufficient flexibility and spinnability may not be obtained. On the other hand, at more than 50 wt %, the reactivity may decrease and a polyurethane having sufficient elastic recovery and compression set may be impossible to obtain.

Illustrative examples of low-molecular-weight diamines include diamines such as ethylenediamine, butanediamine, propylenediamine, hexamethylenediamine, xylylenediamine, 4,4-diaminodiphenylmethane and hydrazine; and hydrazides such as dihydrazide, carbodihydrazide and β-aminopropionic acid hydrazide.

A low-molecular-weight diol and a low-molecular-weight diamine may be used together.

Illustrative examples of the end-capping agent that may be added if necessary include monoalkylamines such as isopropylamine, n-butylamine, t-butylamine and 2-ethylhexylamine; dialkylamines such as diethylamine, diisopropylamine, di-n-butylamine, di-t-butylamine, diisobutylamine and di-2-ethylhexylamine; and alkyl alcohols such as methanol, ethanol, propanol, butanol and pentanol.

The end-capping agent may be advantageously used in an amount of, for example, from 1 to 10 wt % with respect to the low-molecular-weight diamine. At less than 1 wt %, hard segments in the resulting polyurethane increase and the viscosity stability may decrease. At more than 10 wt %, the polyurethane has a good viscosity stability, but the degree of polymerization may decrease.

Alternatively, the end-capping agent may be a polyfunctional active hydrogen compound which has functional groups such as hydroxyl groups and/or amino groups within a range that does not impede the spinnability, and has an average number of functional groups (number of active hydrogen atoms in the molecule) of from 3 to 6. Illustrative examples of this polyfunctional active hydrogen compound include glycerol, trimethylolethane, trimethylolpropane and hexanetriol (all of which are trifunctional), pentaerythritol (tetrafunctional), sorbose (pentafunctional), sorbitol (hexafunctional), and 1,3,5-triaminobenzene (trifunctional). Compounds in which the number of functional groups is 3 are especially preferable because they do not exert a large influence on the elasticity (flexibility) of the polyurethane ultimately obtained. Of these, glycerol, trimethylolethane and trimethylolpropane are most preferable.

The polyfunctional active hydrogen compound is preferably used in an amount which is not more than 5 equivalent percent based on the total active hydrogens present in the chain extender and the polyfunctional active hydrogen compound. At more than 5 equivalent percent, a polyurethane having sufficient flexibility may not be obtainable, and with a polyurethane having such a low flexibility, the spinnability may not be stable. An amount of not more than 3 equivalent percent is especially preferred.

In cases where the object is to lower the elasticity (flexibility) of the polyurethane, a compound having four or more functional groups may be used.

When a solvent is used in the above-described prepolymer synthesis and/or urethane-forming reaction, the solvent may be any inert solvent which does not have an adverse influence on the reaction. Illustrative examples of such solvents include polar solvents such as N,N-dimethylformamide, N,N-dimethylacetamide, N,N,N',N'-tetramethylurea, N-methylpyrrolidone and dimethylsulfoxide. The solvent used as the spinning solvent may be the reaction solvent.

In the present invention, the nitrogen content in the polyurethane making up the nanofibers is preferably from 2.0 to 3.5 wt %. At a nitrogen content of less than 2.0 wt %, the concentration of bonds that take part in the reaction with isocyanate decreases, which may lower the heat resistance and abrasion resistance. On the other hand, at a nitrogen content greater than 3.5 wt %, the cohesive forces of the hard segments within the polyurethane which originate from the (aromatic) isocyanate compound become stronger, which may lower the elastic recovery.

Moreover, in the present invention, a commercially available product may be used as the ester polyurethane resin. Illustrative examples of such commercial polyurethane resins include Luckskin® U-2216 (resin solids, 30%; dilution solvents: dimethylformamide (DMF), methyl ethyl ketone (MEK); available from Seikoh Chemicals Co., Ltd.), Resamine® ME44ELP (resin solids, 30%; dilution solvents: DMF, MEK; available from Dainichi Seika Colour & Chemicals Mfg, Co., Ltd.), Miractran® P26SRNAT (available from Nippon Polyurethane Industry Co., Ltd.), and Miractran® 22SRNAT (available from Nippon Polyurethane Industry Co., Ltd.).

(4) Polyacrylonitrile Resins

Polyacrylonitrile resins are exemplified by polyacrylonitrile, and polymers obtained from acrylonitrile as the primary ingredient (at least 50 wt %) with the balance being at least one other ethylenically unsaturated compound.

The other ethylenically unsaturated compound may be any of various types of known unsaturated compounds that are capable of copolymerization with acrylonitrile, including vinyl halides such as vinyl chloride, vinyl bromide, vinyl fluoride and vinylidene chloride; unsaturated carboxylic acids such as acrylic acid, methacrylic acid, maleic acid and itaconic acid, and salts thereof; (meth)acrylic acid esters such as methyl(meth)acrylate, ethyl(meth)acrylate, butyl(meth)acrylate, octyl(meth)acrylate, methoxyethyl(meth)acrylate, phenyl(meth)acrylate, and cyclohexyl(meth)acrylate; unsaturated ketones such as methyl vinyl ketone, phenyl vinyl ketone, methyl isobutenyl ketone and methyl isopropenyl ketone; vinyl esters such as vinyl formate, vinyl acetate, vinyl propionate, vinyl butyrate and vinyl benzoate; vinyl ethers such as methyl vinyl ether and ethyl vinyl ether; acrylamides and alkyl-substituted acrylamides; unsaturated sulfonic acids such as vinylsulfonic acid, allylsulfonic acid, methallylsulfonic acid and styrenesulfonic acid, and salts thereof; styrenes such as styrene, methylstyrene and chlorostyrene, and alkyl- or halogen-substituted forms thereof; allyl alcohols and esters or ethers thereof; basic vinyl compounds such as vinylpyridine, vinylimidazole and dimethylaminoethyl methacrylate; unsaturated aldehydes such as acrolein and methacrolein; unsaturated nitriles such as methacrylonitrile and vinylidene cyanide; and crosslinkable vinyl compounds such as glycidyl methacrylate, N-methylolacrylamide, hydroxyethyl methacrylate, divinylbenzene and ethylene glycol diacrylate.

(5) Polyamideimide Resin

Various polyamideimide resins obtained by the reaction of trimellitic anhydride with an aromatic diamine may be used as the polyamideimide resin. Examples of commercial products include Torlon® 4000T (available from Solvay Advanced Polymers K.K.) and Vylomax® (available from Toyobo Co., Ltd.).

(6) Polyacrylic Acid Resins

Illustrative examples of polyacrylic acid resins include polyacrylic acid and polymethacrylic acid, polyacrylates such as polymethyl acrylate and polyethyl acrylate, polymethacrylates such as polymethyl methacrylate and polyethyl methacrylate, poly-α-haloacrylates, poly-α-cyanoacrylates, polyacrylamides and sodium polyacrylates.

(7) Polyvinyl Chloride Resins

Illustrative examples of polyvinyl chloride resins include polyvinyl chloride and polyvinylidene chloride.

(8) Polystyrene Resins

Polystyrene resins are exemplified by polystyrene.

The nanofiber of the present invention may be composed solely of the above-described polymer, although suitable amounts of known additives may be included for the purpose of imparting various properties.

Illustrative examples of the additives include ultraviolet absorbers such as benzophenone compounds and benzotriazole compounds; antioxidants such as hindered phenol compounds, phosphite compounds and thioether compounds; light stabilizers such as hindered amine compounds, and other stabilizers such as semicarbazide compounds; inorganic fine particles such as barium sulfate, magnesium oxide, magnesium silicate, calcium silicate, zinc oxide and hydrotalcite; antiblocking agents such as magnesium stearate, calcium stearate, polytetrafluoroethylene and organosiloxane; and pigments, brighteners, dye enhancers, gas facing inhibitors, fillers, stabilizers, flame retardants, antistatic agents, surface treatment agents, delustering agents, colorants, mildewproofing agents, softeners, parting agents, blowing agents, extenders and nucleating agents.

The antibacterial nanofiber of the present invention may be obtained by spinning the above-described polymer using any of various spinning processes, such as electrostatic spinning, spunbonding, melt blowing or flash spinning.

In the practice of the invention, the use of an electrostatic spinning process, which is capable of manufacturing the fibers to a relatively uniform diameter in a range of at least 1 nm but less than 1,000 mm, is preferred. Moreover, this process also has the advantage that, when a nanofiber layer is deposited directly onto a textile material layer, the influence of heat on the textile material is small.

Electrostatic spinning is a process in which, as an electrically charged electrostatic spinning dope (resin solution) is spun within an electrical field, the dope is broken up by forces of repulsion between the electric charges, resulting in the formation of a very fine fibrous material composed of the resin.

The basic configuration of the apparatus which carries out electrostatic spinning includes a first electrode which also serves as a nozzle for discharging the dope to be electrostatically spun and which applies to the dope a high voltage of from several thousand to several tens of thousand of volts, and a second electrode which faces the first electrode. The dope which has been ejected or shaken from the first electrode becomes nanofibers due to the high-speed jets and the subsequent folding and expansion of the jets within the electrical field between the two opposed electrodes, and collects on the surface of the second electrode, thereby giving nanofibers (nonwoven fabric).

The solvent used in preparing the dope for electrostatic spinning is not subject to any particular limitation, provided it is able to dissolve each type of polymer. Illustrative examples of suitable solvents include acetone, methanol, ethanol, propanol, isopropanol, toluene, benzene, cyclohexane, cyclohexanone, tetrahydrofuran, dimethylsulfoxide, 1,4-dioxane, carbon tetrachloride, methylene chloride, chloroform, pyridine, trichloroethane, N,N-dimethylformamide, N,N-dimethylacetamide, N-methyl-2-pyrrolidone, ethylene carbonate, diethyl carbonate, propylene carbonate, acetonitrile, and organic acids such as formic acid, lactic acid and acetic acid. These solvents may be used singly or as mixtures of two or more thereof.

Of these solvents, when a polyamide resin is to be spun, to further enhance the antibacterial properties of the nanofiber, the use of a solvent containing formic acid is preferred, and the use of a solvent composed solely of formic acid is especially preferred.

Preferred solvents for preparing a polyurethane resin solution include N,N-dimethylformamide, N,N-dimethylacetamide and dimethylsulfoxide.

The nanofiber of the invention may be handled as a textile material composed of fibers, such as a nonwoven fabric, felt, paper or sheet. In such cases, the nanofibers may be blended or covered by a known technique with fibers having a diameter of at least 1 µm.

The thickness of the nanofiber textile material is preferably at least 1 µm. At a thickness below 1 µm, handleability and finishability may decrease. To achieve a greater thickness, the textile material may be created as a composite textile material using also fibers having a diameter of at least 1 µm.

Because the above-described nanofibers of the invention and textile materials constructed so as to include these have in themselves inherent antibacterial properties, they may be suitably used in wipes, masks, filters, filter media, harmful substance-removing products, gloves, dustcloths, wipers, mats, car seats, ceiling materials, wallpaper, diapers, hospital gowns, medical apparel, sheets, packaging materials, interlinings, seedling pots, seedling mats, civil engineering and construction materials, leg apparel such as pantyhose, socks and tights; innerwear worn directly against the skin, such as briefs, trunks, underwear, girdles, brassieres, leggings, bathing suits and gloves; "intermediate wear" such as sweaters, vests, training wear and leotards; various types of sports-related apparel such as for skiing and baseball; and sleepwear and bedding such as pajamas, gowns, sheets, futon fabrics and blankets.

EXAMPLES

Examples of the invention and Comparative Examples are given below by way of illustration, and not by way of limitation. Tests and measurements in the Examples and Comparative Examples below were carried out by the following methods.

[1] Average Fiber Diameter

The fiber diameter was measured at 20 places selected at random from a micrograph obtained by capturing an image of the specimen surface at a magnification of 5,000× with a scanning electron microscope (S-4800I, manufactured by Hitachi High-Technologies Corporation; or JSM-6701F, manufactured by JEOL Datum). The average (n=20) for all the fiber diameters was calculated and treated as the average fiber diameter.

[2] Thickness of Nonwoven Fabric

Using a digital thickness gauge (SMD-565, manufactured by Teclock Corporation), the thickness was measured under a measurement force of 1.5 N at five places selected at random on the specimen. The average (n=5) of all the thicknesses was calculated and treated as the thickness of the nonwoven fabric.

[3] Basis Weight of Nonwoven Fabric

The weight of the specimen was measured, and converted into a value per square meter.

[4] Antibacterial Activity Measuring Test (Cell Count Measurement Method)

The test was carried out using the following cell count measurement method described in K•kin B•sh• Kak• Seihin no Kak• K• ka Hy•ka Shiken Manyuaru [Manual for Evaluating and Testing the Effects of Treatment in Antimicrobial Deodorization-Finished Products] established by the Sen'i Seihin Eisei Kak• Ky•gikai (Japanese Association for the Hygienic Finishing of Textiles).

A suspension of *Staphylococcus aureus* as the test organism was initially prepared by culturing this organism in a common bouillon medium and adjusting the concentration to about $10^6$ to $10^7$ cells/mL. The suspension (0.2 mL) was uniformly inoculated onto 0.4 g of the specimen in a sterilized threaded vial and static cultured at 36 to 38° C. for 18 hours, following which 20 mL of sterile, buffered physiological saline was added to the vessel and the vessel contents were shaken vigorous by hand 25 to 30 times at an amplitude of 30 cm so as to disperse the live cells in the specimen within the liquid. Next, a suitable dilution series was created with sterile, buffered physiological saline, 1 mL of dilution at each stage was placed in two Petri dishes, and about 15 mL of standard agar culture medium was added. Culturing was then carried out at 36 to 38° C. for 24 to 48 hours, following which the number of live colonies was counted and the live cell count in the specimen was computed in accordance with the degree of dilution. In rating the effects, the test was judged to be complete when the growth value exceeded 1.5. The bacteriostatic activity S and the bactericidal activity L were determined from the following formulas.

$$\text{Bacteriostatic activity } S = B - C$$

$$\text{Bactericidal activity } L = A - C$$

where
- A: average common log value of live cell count for three specimens immediately after inoculating a standard cloth with test organisms
- B: average common log value of live cell count for three specimens after culturing standard cloth for 18 hours
- C: average common log value of live cell count for three specimens after culturing antibacterially finished specimen for 18 hours

[5] Surface Functional Group Measurement Test (Titration Method)

Fifty milliliters of a 0.01N solution of sodium hydroxide was added to 3 g of specimen and shaken overnight. Next, 20 mL of the shaken solution was removed, ten drops of phenol red was added thereto, and titration was carried out thereon with a 0.01N aqueous solution of hydrochloric acid. The equivalents of sodium hydroxide which reacted with the specimen was determined with the following formula.

$$\text{Amount of sodium hydroxide consumed (meq/g)} = ((A-B) \times 0.01 \times 1 \times (50/20))/C$$

where
- A: Titer of 0.01N aqueous hydrochloric acid solution blank
- B: Titer of 0.1N aqueous hydrochloric acid solution
- C: Specimen weight

[6] Measurement of Infrared Absorption Spectrum

The infrared absorption spectrum was measured using a Fourier transform infrared spectrometer (Shimadzu FT-IR-8900) and an attenuated total reflectance (ATR) attachment (MIRacle, a single-reflection, horizontal ATR attachment).

Measurement was carried out using a germanium prism, at an incident angle of 45°, at a resolution of 16 cm$^{-1}$, and by collecting 50 interferograms/spectrum.

The ratio $A_2/A_1$ (carbonyl groups/amino groups) between the height $A_2$ from a baseline (100% T) of a peak attributable to the C=O groups (1640 cm$^{-1}$) of the amide bonds in the polyamide fibers and the height $A_1$ from the same baseline of a peak attributable to the NH groups (1550 cm$^{-1}$) of the amide bonds was calculated.

[7] Number-Average Molecular Weight of Polymeric Diol

The hydroxyl value was determined in accordance with JIS K 1557, and the number-average molecular weight was calculated using the following equation.

$$\text{Number-average molecular weight (Mw)} = \text{moles of OH} \times 56.1 \times 1000/\text{OH value}$$

[8] Nitrogen Content of Polyurethane (N wt %)

The nitrogen content was calculated as follows from the synthesis composition.

$$\text{Nitrogen content (N wt \%)} = ((\text{moles of organic diisocyanate} \times 2 \times 14)/(\text{total weight})) \times 100$$

Example 1

Polylactic Acid

Ten parts by weight of polylactic acid resin (LACEA H280, available from Mitsui Chemicals, Inc.) and 45 parts by weight of dimethylformamide (abbreviated below as "DMF") were mixed and heated to 60° C., thereby dissolving the polylactic acid resin in the DMF and obtaining 55 parts by weight of a polylactic acid-containing solution (solids content, 18 wt %).

This lactic acid-containing solution (spinning dope) was placed in a syringe and electrostatic spinning was carried out at a discharge tip orifice diameter of 0.4 mm, an applied voltage of 20 KV (at room temperature and atmospheric pressure), and a distance from the discharge tip orifice to the fibrous substance collecting electrode of 15 cm, thereby giving a nanofiber nonwoven fabric.

The resulting nonwoven fabric had an average fiber diameter of 500 nm, and fibers with a diameter greater than 3 μm were not observed. The nonwoven fabric had a thickness of 100 μm and a basis weight of 15 g/m$^2$. FIG. 1 shows an electron micrograph of the nonwoven fabric obtained.

Bond Energy Ratio

The electron-withdrawing group bond energy, total bond energy and bond energy ratio for the polylactic acid were calculated as follows.

The smallest unit structure of polylactic acid is O—CH(CH$_3$)—C=O.

The following are present in this smallest unit structure: one C—O bond, four C—H bonds, two C—C bonds, and one C=O bond.

From Table 1 above, at 25° C., the C—O bond energy is 329 kJ/mol, the C—H bond energy is 416 kJ/mol, the C—C bond energy is 357 kJ/mol, and the C=O bond energy is 804 kJ/mol.

Therefore, the total bond energy is 329×1+416×4+357×2+804=3,511 kJ/mol.

At the same time, in the above smallest unit structure, because the electron-withdrawing groups (atomic groups) are C—O and C=O, the electron-withdrawing group bond energy is 329×1+804×1=1,133 kJ/mol.

Therefore, the bond energy ratio is 1,133/3,511=0.32.

Example 2

Nylon 66

Ten parts by weight of nylon 66 (Amilan® CM3001-N; manufactured by Toray Industries, Inc.) was dissolved in 57 parts by weight of formic acid at room temperature (25° C.), thereby obtaining 67 parts by weight of a nylon 66-containing solution (solids content, 15 wt %).

This nylon 66-containing solution (spinning dope) was placed in a syringe and electrostatic spinning was carried out at a discharge tip orifice diameter of 0.4 mm and an applied voltage of 50 KV (at room temperature and atmospheric pressure), thereby giving a nanofiber nonwoven fabric. The resulting nonwoven fabric had an average fiber diameter of 250 nm, and fibers with a diameter greater than 1 µm were not observed. The nonwoven fabric had a thickness of 50 µm and a basis weight of 2.0 g/m².

The ratio $A_2/A_1$ of the peak height $A_2$ near 1640 cm$^{-1}$ to the peak height $A_1$ near 1550 cm$^{-1}$ in an infrared absorption spectrum of this nonwoven fabric was 1.7.

Bond Energy Ratio

From Table 1 above, at 25° C., the C—H bond energy is 416 kJ/mol, the C—C bond energy is 357 kJ/mol, the C=O bond energy is 804 kJ/mol, the C—N bond energy is 273 kJ/mol, and the N—H bond energy is 391 kJ/mol.

The total bond energy is thus 416×22+357×10+804+273×2+391×2=14,854 kJ/mol.

The electron-withdrawing group bond energy is 804+273×2+391×2=2,132 kJ/mol.

Therefore, the bond energy ratio is 2,132/14,854=0.14.

Example 3

Nylon 6

Aside from using nylon 6 (A1030BRT, produced by Unitika, Ltd.) instead of nylon 66, a nanofiber nonwoven fabric was obtained in the same way as in Example 2.

The resulting nonwoven fabric had an average fiber diameter of 300 nm, and fibers with a diameter greater than 1 µm were not observed. The nonwoven fabric had a thickness of 50 µm and a basis weight of 3.5 g/m².

The ratio $A_2/A_1$ of the peak height $A_2$ near 1640 cm$^{-1}$ to the peak height $A_1$ near 1550 cm$^{-1}$ in an infrared absorption spectrum of this nonwoven fabric was 1.7.

Bond Energy Ratio

From Table 1 above, at 25° C., the C—H bond energy is 416 kJ/mol, the C—C bond energy is 357 kJ/mol, the C=O bond energy is 804 kJ/mol, the C—N bond energy is 273 kJ/mol, and the N—H bond energy is 391 kJ/mol.

The total bond energy is thus 416×10+357×5+804+273+391=7,413 kJ/mol.

The electron-withdrawing group bond energy is 804+273+391=1,468 kJ/mol.

Therefore, the bond energy ratio is 1,468/7,413=0.20.

Example 4

Nylon 66

One hundred parts by weight of nylon 66 (Amilan® CM3001-N; manufactured by Toray Industries, Inc.) was dissolved in 570 parts by weight of formic acid at room temperature (25° C.), thereby obtaining 670 parts by weight of a nylon 66-containing solution (spinning dope).

Using this spinning dope, electrostatic spinning was carried out at a discharge tip orifice diameter of 0.5 mm and an applied voltage of 50 KV (at room temperature and atmospheric pressure), thereby giving a nanofiber nonwoven fabric.

The resulting nonwoven fabric had an average fiber diameter of 300 nm, and fibers with a diameter greater than 1,000 nm were not observed. The nonwoven fabric had a thickness of 50 µm and a basis weight of 2.0 g/m².

The ratio $A_2/A_1$ of the peak height $A_2$ near 1640 cm$^{-1}$ to the peak height $A_1$ near 1550 cm$^{-1}$ in an infrared absorption spectrum of this nonwoven fabric was 1.5. FIG. 2 shows an electron micrograph of the nonwoven fabric obtained, and FIG. 10 shows the infrared absorption spectrum.

Example 5

Nylon 66

Aside from changing the applied voltage to 70 KV (at room temperature and atmospheric pressure), a nanofiber nonwoven fabric was obtained in the same way as in Example 4.

The resulting nonwoven fabric had an average fiber diameter of 100 nm, and fibers with a diameter greater than 1,000 nm were not observed. The nonwoven fabric had a thickness of 50 µm and a basis weight of 1.5 g/m².

The ratio $A_2/A_1$ of the peak height $A_2$ near 1640 cm$^{-1}$ to the peak height $A_1$ near 1550 cm$^{-1}$ in an infrared absorption spectrum of this nonwoven fabric was 1.5.

Example 6

Nylon 66

Aside from carrying out preparation of the spinning dope at 50° C., a nanofiber nonwoven fabric was obtained in the same way as in Example 4.

The resulting nonwoven fabric had an average fiber diameter of 80 nm, and fibers with a diameter greater than 1,000 nm were not observed. The nonwoven fabric had a thickness of 50 µm and a basis weight of 1.1 g/m².

The ratio $A_2/A_1$ of the peak height $A_2$ near 1640 cm$^{-1}$ to the peak height $A_1$ near 1550 cm$^{21}$ in an infrared absorption spectrum of this nonwoven fabric was 1.6.

Example 7

Nylon 6

Aside from using nylon 6 (A1030BRT, produced by Unitika, Ltd.) instead of nylon 66, a nanofiber nonwoven fabric was obtained in the same way as in Example 4.

The resulting nonwoven fabric had an average fiber diameter of 250 nm, and fibers with a diameter greater than 1,000 nm were not observed. The nonwoven fabric had a thickness of 50 µm and a basis weight of 3.5 g/m².

The ratio $A_2/A_1$ of the peak height $A_2$ near 1640 cm$^{-1}$ to the peak height $A_1$ near 1550 cm$^{-1}$ in an infrared absorption spectrum of this nonwoven fabric was 1.3. FIG. 3 shows an electron micrograph of the resulting nonwoven fabric.

Example 8

Nylon 9T

Aside from using nylon 9T (Genestar® N1000, produced by Kuraray Co., Ltd.) instead of nylon 66, a nanofiber nonwoven fabric was obtained in the same way as in Example 4. The resulting nonwoven fabric had an average fiber diameter of 300 nm, and fibers with a diameter greater than 1,000 nm were not observed. The nonwoven fabric had a thickness of 50 µm and a basis weight of 5.0 g/m².

The ratio $A_2/A_2$ of the peak height $A_2$ near 1640 cm$^{-1}$ to the peak height $A_1$ near 1550 cm$^{-1}$ in an infrared absorption spectrum of this nonwoven fabric was 1.3.

Bond Energy Ratio

From Table 1 above, at 25° C., the C—H bond energy is 416 kJ/mol, the C—C bond energy is 357 kJ/mol, the C=O bond energy is 804 kJ/mol, the C—N bond energy is 273 kJ/mol, the N—H bond energy is 391 kJ/mol, and the C=C bond energy is 588 kJ/mol.

The total bond energy is thus 416×18+357×12+804+273×3+391×2+588×3=15,941 kJ/mol.

The electron-withdrawing group bond energy is 804+273×3+391×2+588×3=4,169 kJ/mol.

Therefore, the bond energy ratio is 4,169/15,941=0.26.

Example 9

Nylon 610

Aside from using nylon 610 (Amilan® CM2001, produced by Toray Industries, Ltd.) instead of nylon 66, a nanofiber nonwoven fabric was obtained in the same way as in Example 4. The resulting nonwoven fabric had an average fiber diameter of 300 nm, and fibers with a diameter greater than 1,000 nm were not observed. The nonwoven fabric had a thickness of 50 μm and a basis weight of 5.0 g/m².

The ratio $A_2/A_1$ of the peak height $A_2$ near 1640 cm$^{-1}$ to the peak height $A_1$ near 1550 cm$^{-1}$ in an infrared absorption spectrum of this nonwoven fabric was 1.3.

Bond Energy Ratio

From Table 1 above, at 25° C., the C—H bond energy is 416 kJ/mol, the C—C bond energy is 357 kJ/mol, the C=O bond energy is 804 kJ/mol, the C—N bond energy is 273 kJ/mol, and the N—H bond energy is 391 kJ/mol.

The total bond energy is thus 416×28+357×13+804+273×3+391×2=18,694 kJ/mol.

The electron-withdrawing group bond energy is 804+273×3+391×2=2,405 kJ/mol.

Therefore, the bond energy ratio is 2,405/18,694=0.13.

Example 10

Aromatic Polyamide

Aside from using a meta-type wholly aromatic polyamide fiber (Conex®, produced by Teijin, Ltd.) instead of nylon 66, a nanofiber nonwoven fabric was obtained in the same way as in Example 4. The resulting nonwoven fabric had an average fiber diameter of 200 nm, and fibers with a diameter greater than 1,000 nm were not observed. The nonwoven fabric had a thickness of 50 μm and a basis weight of 3.0 g/m².

The ratio $A_2/A_1$ of the peak height $A_2$ near 1640 cm$^{-1}$ to the peak height $A_1$ near 1550 cm$^{-1}$ in an infrared absorption spectrum of this nonwoven fabric was 1.4.

Bond Energy Ratio

From Table 1 above, at 25° C., the C—H bond energy is 416 kJ/mol, the C—C bond energy is 357 kJ/mol, the C=O bond energy is 804 kJ/mol, the C—N bond energy is 273 kJ/mol, the N—H bond energy is 391 kJ/mol, the C=C bond energy is 588 kJ/mol, and the C—O bond energy is 329 kJ/mol.

The total bond energy is thus 416×16+357×13+804×2+273×5+391×3+588×12+329×2=23,157 kJ/mol.

The electron-withdrawing group bond energy is 804×2+273×5+391×3+588×12+329×2=11,860 kJ/mol.

Therefore, the bond energy ratio is 11,860/23,157=0.51.

Example 11

Ester-type Polyurethane

Adipic acid (Wako Pure Chemical Industries, Ltd.) and ethylene glycol (Wako Pure Chemical Industries, Ltd.) were mixed in a molar ratio of 1:1.2, and a dehydrative esterification reaction was carried out in the presence of tetra-n-butyl titanate as the catalyst and at 140 to 220° C., thereby giving a polyester diol (number-average molecular weight, 1,950).

This polyester diol (69.4 parts by weight) and 25 parts by weight of 4,4'-diphenylmethane diisocyanate (abbreviated below as "MDI"; Millionate® MT, available from Nippon Polyurethane Industry Co., Ltd.) were reacted in a nitrogen gas-sealed system at 80° C. for 1 hour under stirring, following which 5.6 parts by weight of 1,4-butanediol, a low-molecular-weight diol, was added, thereby obtaining an ester polyurethane.

This ester-type polyurethane was solid phase reacted for 5 days in a 40° C., 80% relative humidity room, following which 400 parts by weight of dimethylformamide (abbreviated below as "DMF") was added and dissolution therein was effected at 60° C., yielding 500 parts by weight of an ester polyurethane-containing solution. The ester polyurethane had a nitrogen content of N 2.7 wt %.

This ester polyurethane-containing solution (spinning dope) was placed in a syringe and electrostatic spinning was carried out at a discharge tip orifice diameter of 0.4 mm, an applied voltage of 30 KV (at room temperature and atmospheric pressure), and a distance from the discharge tip orifice to the fibrous substance collecting electrode of 15 cm, thereby giving a nanofiber nonwoven fabric.

The resulting nonwoven fabric had an average fiber diameter of 500 nm, and fibers with a diameter greater than 1 μm were not observed. The nonwoven fabric had a thickness of 100 μm and a basis weight of 15 g/m². FIG. 4 shows an electron micrograph of the nonwoven fabric obtained.

Bond Energy Ratio

From Table 1 above, at 25° C., the C—H bond energy is 416 kJ/mol, the C—C bond energy is 357 kJ/mol, the C=O bond energy is 804 kJ/mol, the C—N bond energy is 273 kJ/mol, the N—H bond energy is 391 kJ/mol, the C=C bond energy is 588 kJ/mol, and the C—O bond energy is 329 kJ/mol.

The total bond energy is thus 416×130+357×68+804×21+273×2+391+588×6+329×30=109,575 kJ/mol.

The electron-withdrawing group bond energy is 804×21+273×2+391+588×6+329×30=31,219 kJ/mol.

Therefore, the bond energy ratio is 31,219/109,575=0.28.

Example 12

Ester-type Polyurethane

The polyester diol obtained in the same way as in Example 11 (160 parts by weight) and 37.1 parts by weight of MDI were mixed, then reacted in a stream of nitrogen gas at 65° C. for 90 minutes under stirring, thereby giving a prepolymer having isocyanate groups at both ends. The resulting prepolymer was cooled to room temperature, following which 450 parts by weight of dimethylacetamide (abbreviated below as "DMAc") was added, thereby preparing a prepolymer solution.

Next, the temperature of the prepolymer solution was adjusted to 15° C. and a mixed amine solution composed of 3.8 parts by weight of ethylenediamine (Wako Pure Chemical Industries, Ltd.) as the chain extender and 0.5 part by weight of di-n-butylamine (Showa Chemical Industry Co., Ltd.) as the end-capping agent dissolved in 200 parts by weight of DMAc was added dropwise thereto, thereby giving 851.4 parts by weight of an ester-type polyurethane-containing solution (solids content, 24 wt %). The ester polyurethane had a nitrogen content of N 3.0 wt %.

In addition, 491 parts by weight of DMAc was added to the resulting ester-type polyurethane-containing solution, thereby preparing a spinning dope having a solids content of 15 wt %.

Using this spinning dope, electrostatic spinning was carried out under the same conditions as in Example 11, thereby giving a nanofiber nonwoven fabric.

The resulting nonwoven fabric had an average fiber diameter of 300 nm, and fibers with a diameter greater than 1,000 nm were not observed. The nonwoven fabric had a thickness of 100 μm and a basis weight of 10 g/m². FIG. 5 shows an electron micrograph of the resulting nonwoven fabric.

The bond energy ratio was the same as in Example 11.

Example 13

Ester-Type Polyurethane

Aside from using as the polyester diol 170 parts by weight of a polyester diol (number-average molecular weight, 1,950) obtained in the same way as in Example 11 from adipic acid and propylene glycol (Wako Pure Chemical Industries, Ltd.) and using as the chain extender 3.6 parts by weight of ethylenediamine, 861.2 parts by weight of an ester-type polyurethane-containing solution (solids content, 24 wt %) was obtained in the same way as in Example 12. The ester-type polyurethane had a nitrogen content of N 2.8 wt %.

Using this ester-type polyurethane-containing solution, a spinning dope was prepared in the same way as in Example 12, and electrostatic spinning was carried out under the same conditions as in Example 11, thereby giving a nanofiber nonwoven fabric.

The resulting nonwoven fabric had an average fiber diameter of 300 nm, and fibers with a diameter greater than 1,000 nm were not observed. The nonwoven fabric had a thickness of 100 μm and a basis weight of 10 g/m².

Bond Energy Ratio

From Table 1 above, at 25° C., the C—H bond energy is 416 kJ/mol, the C—C bond energy is 357 kJ/mol, the C=O bond energy is 804 kJ/mol, the C—N bond energy is 273 kJ/mol, the N—H bond energy is 391 kJ/mol, the C=C bond energy is 588 kJ/mol, and the C—O bond energy is 329 kJ/mol.

The total bond energy is thus 416×150+357×78+804×21+273×2+391+588×6+329×30=121,465 kJ/mol.

The electron-withdrawing group bond energy is 804×21+273×2+391+588×6+329×30=31,219 kJ/mol.

Therefore, the bond energy ratio is 31,219/121,465=0.26.

Example 14

Ester-Type Polyurethane

Aside from using as the polyester diol 160 parts by weight of a polyester diol (number-average molecular weight, 1,950) obtained in the same way as in Example 11 from succinic acid (Showa Chemical Industry Co., Ltd.) and 3-methyl-1,5-pentanediol (Wako Pure Chemical Industries, Ltd.), 851.4 parts by weight of an ester polyurethane-containing solution (solids content, 24 wt %) was obtained in the same way as in Example 12. The ester-type polyurethane had a nitrogen content of N 3.0 wt %. Using this ester-type polyurethane-containing solution, a spinning dope was prepared in the same way as in Example 12, and electrostatic spinning was carried out under the same conditions as in Example 11, thereby giving a nanofiber nonwoven fabric.

The resulting nonwoven fabric had an average fiber diameter of 300 nm, and fibers with a diameter greater than 1,000 nm were not observed. The nonwoven fabric had a thickness of 100 μm and a basis weight of 10 g/m².

Bond Energy Ratio

From Table 1 above, at 25° C., the C—H bond energy is 416 kJ/mol, the C—C bond energy is 357 kJ/mol, the C=O bond energy is 804 kJ/mol, the C—N bond energy is 273 kJ/mol, the N—H bond energy is 391 kJ/mol, the C=C bond energy is 588 kJ/mol, and the C—O bond energy is 329 kJ/mol.

The total bond energy is thus 416×170+357×88+804×21+273×2+391+588×6+329×30=133,355 kJ/mol.

The electron-withdrawing group bond energy is 804×21+273×2+391+588×6+329×30=31,219 kJ/mol.

Therefore, the bond energy ratio is 31,219/133,355=0.23.

Example 15

Ester-Type Polyurethane

Aside from using as the polyester diol 160 parts by weight of a polyester diol (number-average molecular weight, 1,950) obtained in the same way as in Example 11 from maleic acid (Wako Pure Chemical Industries, Ltd.) and ethylene glycol, 851.4 parts by weight of an ester-type polyurethane-containing solution (solids content, 24 wt %) was obtained in the same way as in Example 11. The ester-type polyurethane had a nitrogen content of N 3.0 wt %.

Using this ester-type polyurethane-containing solution, a spinning dope was prepared in the same way as in Example 12, and electrostatic spinning was carried out under the same conditions as in Example 11, thereby giving a nanofiber nonwoven fabric.

The resulting nonwoven fabric had an average fiber diameter of 300 nm and fibers with a diameter greater than 1,000 nm were not observed. The nonwoven fabric had a thickness of 100 μm, and a basis weight of 10 g/m².

Bond Energy Ratio

From Table 1 above, at 25° C., the C—H bond energy is 416 kJ/mol, the C—C bond energy is 357 kJ/mol, the C=O bond energy is 804 kJ/mol, the C—N bond energy is 273 kJ/mol, the N—H bond energy is 391 kJ/mol, the C=C bond energy is 588 kJ/mol, and the C—O bond energy is 329 kJ/mol.

The total bond energy is thus 416×94+357×50+804×29+273×2+391+588×20+329×42=106,785 kJ/mol.

The electron-withdrawing group bond energy is 804×29+273×2+391+588×20+329×42=49,831 kJ/mol.

Therefore, the bond energy ratio is 49,831/106,785=0.47.

Example 16

Ester-Type Polyurethane

Aside from using 160 parts by weight of poly-ε-caprolactone diol (number-average molecular weight, 2,000; Praccel® 220; available from Daicel Chemical Industries, Ltd.) as the polyester diol, 851.4 parts by weight of an ester-type polyurethane-containing solution (solids content, 24 wt %) was obtained in the same way as in Example 12. The ester-type polyurethane had a nitrogen content of N 3.0 wt %.

DMAc (1,162.6 parts by weight) was added to this ester-type polyurethane-containing solution, and a spinning dope having a solids content of 10 wt % was prepared. Using this spinning dope, electrostatic spinning was carried out under the same conditions as in Example 11, thereby giving a nanofiber nonwoven fabric.

The resulting nonwoven fabric had an average fiber diameter of 150 nm, and fibers with a diameter greater than 1,000 nm were not observed. The nonwoven fabric had a thickness of 100 μm and a basis weight of 5 g/m².
Bond Energy Ratio From Table 1 above, at 25° C., the C—H bond energy is 416 kJ/mol, the C—C bond energy is 357 kJ/mol, the C=O bond energy is 804 kJ/mol, the C—N bond energy is 273 kJ/mol, the N—H bond energy is 391 kJ/mol, the C=C bond energy is 588 kJ/mol, and the C—O bond energy is 329 kJ/mol.

The total bond energy is thus 416×190+357×98+804×19+273×2+391+588×6+329×18=139,689 kJ/mol.

The electron-withdrawing group bond energy is 804×19+273×2+391+588×6+329×18=25,663 kJ/mol.

Therefore, the bond energy ratio is 25,663/139,689=0.18.

Example 17

Ester-Type Polyurethane

Aside from using as the polyester diol 160 parts by weight of a polyester diol (number-average molecular weight, 2,000) obtained in the same way as in Example 11 from diethyl carbonate (Nippon Polyurethane Industry Co., Ltd.) and 1,5-pentanediol (Wako Pure Chemical Industries, Ltd.), 851.4 parts by weight of an ester-type polyurethane-containing solution (solids content, 24 wt %) was obtained in the same way as in Example 12. The ester-type polyurethane had a nitrogen content of N 3.0 wt %.

DMAc (1,162.6 parts by weight) was added to this ester-type polyurethane-containing solution, and a spinning dope having a solids content of 10 wt % was prepared. Using this spinning dope, electrostatic spinning was carried out under the same conditions as in Example 11, thereby giving a nanofiber nonwoven fabric.

The resulting nonwoven fabric had an average fiber diameter of 150 nm, and fibers with a diameter greater than 1,000 nm were not observed. The nonwoven fabric had a thickness of 100 μm and a basis weight of 5 g/m².
Bond Energy Ratio From Table 1 above, at 25° C., the C—H bond energy is 416 kJ/mol, the C—C bond energy is 357 kJ/mol, the C=O bond energy is 804 kJ/mol, the C—N bond energy is 273 kJ/mol, the N—H bond energy is 391 kJ/mol, the C=C bond energy is 588 kJ/mol, and the C—O bond energy is 329 kJ/mol.

The total bond energy is thus 416×160+357×68+804×16+273×2+391+588×6+329×45=122,970 kJ/mol.

The electron-withdrawing group bond energy is 804×6+273×2+391+588×6+329×45=32,134 kJ/mol.

Therefore, the bond energy ratio is 32,134/122,970=0.26.

Example 18

Ester-Type Polyurethane

One hundred parts by weight of the polyester diol (number-average molecular weight, 1,950) composed of adipic acid and ethylene glycol which was obtained in Example 11 and 28.9 parts by weight of MDI were reacted for 1 hour in a nitrogen gas-sealed system at 80° C. and under stirring, following which 5.9 parts by weight of 1,4-butanediol, a low-molecular-weight diol, was added, thereby giving an ester polyurethane. The ester-type polyurethane had a nitrogen content of N 2.4 wt %.

This ester-type polyurethane was solid phase reacted for 5 days in a 40° C., 80% relative humidity room, following which 764 parts by weight of DMF was added and dissolution therein was effected at 60° C., yielding 898 parts by weight of an ester-type polyurethane-containing solution (solid content, 15 wt %).

Using this ester-type polyurethane-containing solution (spinning dope), electrostatic spinning was carried out under the same conditions as in Example 11, thereby giving a nanofiber nonwoven fabric.

The resulting nonwoven fabric had an average fiber diameter of 550 nm, and fibers with a diameter greater than 1,000 nm were not observed. The nonwoven fabric had a thickness of 20 μm and a basis weight of 7 g/m².

The bond energy ratio was the same as in Example 11.

Example 19

Ester-Type Polyurethane

[1] Synthesis of Dihydroxy-Terminated Prepolymer

A dihydroxy-terminated prepolymer was synthesized by reacting 46.5 parts by weight of a polyester diol which, aside from the number-average molecular weight being stopped at 1,000, had been obtained from adipic acid and ethylene glycol in the same way as in Example 11 with 22.7 parts by weight of MDI at 80° C. for 1 hour under stirring in a nitrogen gas-sealed system, then adding 27.6 parts by weight of 1,4-butanediol, a low-molecular-weight diol.

[2] Synthesis of Diisocyanate-Terminated Prepolymer

A diisocyanate-terminated prepolymer was obtained by charging 66 parts by weight of the polyester diol (number-average molecular weight, 1,950) obtained from adipic acid and ethylene glycol in Example 11 and 29.1 parts by weight of MDI, adding 2.2 parts by weight of a mixture of an ultraviolet absorber (2-(3,5-di-t-amyl-2-hydroxyphenyl)benzotriazole, 20 wt %), an antioxidant (3,9-bis(2-(3-(3-t-butyl-4-hydroxy-5-methylphenyl)-propionyloxy)-1,1-dimethylethyl)-2,4,8,10-tetraoxaspiro(5.5)undecane, 50 wt %) and a light stabilizer (bis(2,2,6,6-tetramethyl-4-piperidyl) sebacate, 30 wt %), and stirring for 1 hour at 80° C. in a nitrogen gas-sealed system.

[3] Production of Polyurethane Nanofibers

The resulting diisocyanate-terminated prepolymer and the dihydroxy-terminated prepolymer were continuously fed in a weight ratio of 1:0.302 to a 2,200 mL polyurethane reactor equipped with a stirring element. The feed rates were 14.47 g/min for the diisocyanate-terminated prepolymer and 6.87 g/min for the dihydroxy-terminated prepolymer. The average retention time within the reactor was about 1 hour, and the reaction temperature was about 190° C. This reaction mixture was melt-blended at 250° C. (retention time, 50 seconds) and extruded, thereby giving an ester-type polyurethane. The ester-type polyurethane had a nitrogen content of N 3.2 wt %.

Using this ester-type polyurethane, electrostatic spinning was carried out under the same conditions as in Example 11, thereby giving a nanofiber nonwoven fabric.

The resulting nonwoven fabric had an average fiber diameter of 300 nm, and fibers with a diameter greater than 1,000 nm were not observed. The nonwoven fabric had a thickness of 20 μm and a basis weight of 4 g/m².
Bond Energy Ratio From Table 1 above, at 25° C., the C—H bond energy is 416 kJ/mol, the C—C bond energy is 357 kJ/mol, the C=O bond energy is 804 kJ/mol, the C—N bond energy is 273 kJ/mol, the N—H bond energy is 391 kJ/mol, the C=C bond energy is 588 kJ/mol, and the C—O bond energy is 329 kJ/mol. The total bond energy of the dihydroxy-terminated prepolymer is 416×82+357×44+804×13+273×2+391+588× 6+329×18=70,659 kJ/mol.

The electron-withdrawing group bond energy is 804×13+ 273×2+391+588×6+329×18=20,839 kJ/mol.

Therefore, the bond energy ratio is 20,839/70,659=0.29.

The total bond energy of the diisocyanate-terminated prepolymer is 416×130+357×68+804×21+273×2+391+588×6+ 329×30=109,575 kJ/mol.

The electron-withdrawing group bond energy is 804×21+ 273×2+391+588×6+329×30=31,219 kJ/mol.

Therefore, the bond energy ratio is 31,219/109,575=0.28.

Because the ratio of the diisocyanate-terminated prepolymer to the dihydroxy-terminated prepolymer is 1:0.302, the bond energy ratio for the polymer is (0.28+0.29×0.302)/ 1.302=0.28.

Example 20

Ether-Type Polyurethane

Forty-two parts by weight of polytetramethylene glycol (number-average molecular weight, 1,000; PTMG 1000, available from Hodogaya Chemical Co., Ltd.) and 25 parts by weight of MDI were reacted in a nitrogen gas-sealed system at 80° C. for 1 hour under stirring, following which 5.6 parts by weight of 1,4-butanediol, a low-molecular-weight diol, was also added, thereby giving a polyether-type polyurethane.

This polyether-type polyurethane was solid phase reacted for 5 days in a 40° C., 80% relative humidity room, following which 327.4 parts by weight of DMF was added and dissolution therein was effected at 60° C., yielding 400 parts by weight of an ether-type polyurethane-containing solution. The ether polyurethane had a nitrogen content of N 3.7 wt %. Using this ether-type polyurethane-containing solution (spinning dope), electrostatic spinning was carried out under the same conditions as in Example 11, thereby giving a nanofiber nonwoven fabric.

The resulting nonwoven fabric had an average fiber diameter of 500 nm, and fibers with a diameter greater than 1 μm were not observed. The nonwoven fabric had a thickness of 100 μm and a basis weight of 15 g/m².
Bond Energy Ratio From Table 1 above, at 25° C., the C—H bond energy is 416 kJ/mol, the C—C bond energy is 357 kJ/mol, the C=O bond energy is 804 kJ/mol, the C—N bond energy is 273 kJ/mol, the N—H bond energy is 391 kJ/mol, the C=C bond energy is 588 kJ/mol, and the C—O bond energy is 329 kJ/mol. The total bond energy is thus 416×18+357×11+804+ 273×2+391+588×6+329×2=17,342 kJ/mol.

The electron-withdrawing group bond energy is 804+273× 2+391+588×6+329×2=5,927 kJ/mol. Therefore, the bond energy ratio is 5,927/17,342=0.34.

Example 21

Polyacrylonitrile

Ten parts by weight of polyacrylonitrile (Barex® 1000S; available from Mitsui Chemicals, Inc.) was dissolved in 40 parts by weight of DMF at room temperature (25° C.) to give 50 parts by weight of a polyacrylonitrile-containing solution (solids content, 20 wt %).

This polyacrylonitrile-containing solution (spinning dope) was placed in a syringe and electrostatic spinning was carried out at a discharge tip orifice diameter of 0.4 mm, an applied voltage of 30 KV (at room temperature and atmospheric pressure), and a distance from the discharge tip orifice to the fibrous substance collecting electrode of 15 cm, thereby giving a nanofiber nonwoven fabric.

The resulting nonwoven fabric had an average fiber diameter of 100 nm, and fibers with a diameter greater than 1 μm were not observed. The nonwoven fabric had a thickness of 100 μm and a basis weight of 2 g/m². FIG. 6 shows an electron micrograph of the nonwoven fabric obtained.
Bond Energy Ratio From Table 1 above, at 25° C., the C—H bond energy is 416 kJ/mol, the C—C bond energy is 357 kJ/mol, and the C—N bond energy is 273 kJ/mol.

The total bond energy is thus 416×3+357×2+273×3=2,781 kJ/mol.

The electron-withdrawing group bond energy is 273×3=819 kJ/mol.

Therefore, the bond energy ratio is 819/2,781=0.29.

Example 22

Polyamideimide

Ten parts by weight of polyamideimide (Torlon® 4000T; available from Solvay Advanced Polymers K.K.) was dissolved in 40 parts by weight of DMF at room temperature (25° C.) to give 50 parts by weight of a polyamideimide-containing solution (solids content, 20 wt %).

This polyamideimide-containing solution (spinning dope) was placed in a syringe and electrostatic spinning was carried out at a discharge tip orifice diameter of 0.4 mm, an applied voltage of 30 KV (at room temperature and atmospheric pressure), and a distance from the discharge tip orifice to the fibrous substance collecting electrode of 15 cm, thereby giving a nanofiber nonwoven fabric.

The resulting nonwoven fabric had an average fiber diameter of 800 nm, and fibers with a diameter greater than 5 μm were not observed. The nonwoven fabric had a thickness of 100 μm and a basis weight of 25 g/m². FIG. 7 shows an electron micrograph of the nonwoven fabric obtained.
Bond Energy Ratio From Table 1 above, at 25° C., the C—H bond energy is 416 kJ/mol, the C—C bond energy is 357 kJ/mol, the C=O bond energy is 804 kJ/mol, the C—N bond energy is 273 kJ/mol, the N—H bond energy is 391 kJ/mol, and the C=C bond energy is 588 kJ/mol.

The total bond energy is thus 416×7+357×7+804×3+273× 4+391+588×3=11,070 kJ/mol. The electron-withdrawing group bond energy is 804×3+273×4+391+588×3=5,659 kJ/mol.

Therefore, the bond energy ratio is 5,659/11,070=0.51.

Example 23

Polyvinylidene Chloride

Twenty-five parts by weight of polyvinylidene chloride (Saran Wrap®; available from Asahi Kasei Home Products Corporation) was dissolved in 75 parts by weight of tetrahydrofuran at room temperature (25° C.) to give 100 parts by weight of a polyvinylidene chloride-containing solution (solids content, 25 wt %).

This polyvinylidene chloride-containing solution (spinning dope) was placed in a syringe and electrostatic spinning was carried out at a discharge tip orifice diameter of 0.4 mm, an applied voltage of 50 KV (at room temperature and atmospheric pressure), and a distance from the discharge tip orifice to the fibrous substance collecting electrode of 15 cm, thereby giving a nanofiber nonwoven fabric.

The resulting nonwoven fabric had an average fiber diameter of 800 nm, and fibers with a diameter greater than 5 μm were not observed. The nonwoven fabric had a thickness of 100 μm and a basis weight of 25 g/m$^2$. FIG. 8 shows an electron micrograph of the nonwoven fabric obtained.

Bond Energy Ratio

From Table 1 above, at 25° C., the C—H bond energy is 416 kJ/mol, the C—C bond energy is 357 kJ/mol, and the C=Cl bond energy is 327 kJ/mol.

The total bond energy is thus 416×2+357+327×2=1,843 kJ/mol.

The electron-withdrawing group bond energy is 327×2=654 kJ/mol.

Therefore, the bond energy ratio is 654/1,843=0.35.

Example 24

Polystyrene

Eighteen parts by weight of polystyrene (SGP10, available from PS Japan) was dissolved in 82 parts by weight of DMF at room temperature (25° C.) to give 100 parts by weight of a polystyrene-containing solution (solids content, 18 wt %).

This polystyrene-containing solution (spinning dope) was placed in a syringe and electrostatic spinning was carried out at a discharge tip orifice diameter of 0.4 mm, an applied voltage of 50 KV (at room temperature and atmospheric pressure), and a distance from the discharge tip orifice to the fibrous substance collecting electrode of 15 cm, thereby giving a nanofiber nonwoven fabric.

The resulting nonwoven fabric had an average fiber diameter of 800 nm, and fibers with a diameter greater than 3 μm were not observed. The nonwoven fabric had a thickness of 100 μm and a basis weight of 25 g/m$^2$. FIG. 9 shows an electron micrograph of the nonwoven fabric obtained.

Bond Energy-Ratio

From Table 1 above, at 25° C., the C—H bond energy is 416 kJ/mol, the C—C bond energy is 357 kJ/mol, and the C=C bond energy is 588 kJ/mol.

The total bond energy is thus 416×8+357×5+588×3=6,877 kJ/mol.

The electron-withdrawing group bond energy is 588×3=1,764 kJ/mol.

Therefore, the bond energy ratio is 1,764/6,877=0.26.

Comparative Example 1

Polylactic Acid (Film)

The polylactic acid-containing solution prepared in Example 1 was cast onto a glass plate with a knife coater and dried for 10 hours in a 60° C. vacuum dryer, giving a film having a thickness of 100 μm.

Comparative Example 2

Polylactic Acid (Microfiber)

Ten parts by weight of a polylactic acid resin (LACEA H280, available from Mitsui Chemicals, Inc.) was fed to two 8-nozzle spinning heads held at 200° C. The polylactic acid resin was metered and pressurized by gear pumps mounted on the heads, passed through filters, then discharged from 0.8 mm diameter single-hole nozzles at a rate of 2 g/min into a 6 m long spinning chimney and taken up onto a cardboard bobbin at a speed of 600 m/min, thereby giving fiber having an average fiber diameter of 70 μm.

Comparative Example 3

Nylon 66 (Film)

The nylon 66-containing solution prepared in Example 2 was cast onto a glass plate with a knife coater, and dried for 10 hours in a 60° C. vacuum dryer. The film was then rinsed with water and dried for 3 hours in a 60° C. vacuum dryer, thereby giving a film having a thickness of 100 μm.

Comparative Example 4

Nylon 6 (Film)

Aside from using nylon 6 instead of nylon 66, a film having a thickness of 100 μm was obtained in the same way as in Comparative Example 3.

Comparative Example 5

Nylon 6 (Microfiber)

One hundred parts by weight of nylon 6 (A1030BRT, available from Unitika, Ltd.) was melt-extruded with an extruder and spun at a spinning temperature of 250° C., giving fiber having an average fiber diameter of 1.5 μm. The ratio $A_2/A_1$ of the peak height $A_2$ near 1640 cm$^{-1}$ to the peak height $A_1$ near 1550 cm$^{-1}$ in an infrared absorption spectrum of this fiber was 1.1.

Comparative Example 6

Nylon 66 (Microfiber)

One hundred parts by weight of nylon 66 (Amilan® CM3001-N; manufactured by Toray Industries, Inc.) was melt-extruded with an extruder and spun at a spinning temperature of 290° C., giving fiber having an average fiber diameter of 1.5 μm.

The ratio $A_2/A_1$ of the peak height $A_2$ near 1640 cm$^{-1}$ to the peak height $A_1$ near 1550 cm$^{-1}$ in an infrared absorption spectrum of this fiber was 1.1.

Comparative Example 7

Nylon 9T (Film)

Aside from using nylon 9T (Genestar® N1000, produced by Kuraray Co., Ltd.) instead of nylon 66, a film having a thickness of 100 μm was obtained in the same way as in Comparative Example 3.

Comparative Example 8

Nylon 610 (Film)

Aside from using nylon 610 (Amilan® CM2001; manufactured by Toray Industries, Inc.) instead of nylon 66, a film having a thickness of 100 μm was obtained in the same way as in Comparative Example 3.

Comparative Example 9

Aromatic Polyamide (Microfiber)

Regular-type batting composed of meta-type wholly aromatic polyamide fibers (Conex®; Teijin, Ltd.) obtained by wet spinning was used without modification. The average fiber diameter was about 10 μm. The ratio $A_2/A_1$ of the peak height $A_2$ near 1640 cm$^{-1}$ to the peak height $A_1$ near 1550 cm$^{-1}$ in an infrared absorption spectrum of this fiber was 1.0.

Comparative Example 10

Ester-Type Polyurethane (Film)

The ester-type polyurethane-containing solution prepared in Example 11 was cast onto a glass plate with a knife coater and dried for 10 hours in a 60° C. vacuum dryer, giving a film having a thickness of 100 μm.

Comparative Example 11

Ester-Type Polyurethane (Microfiber)

Ninety parts by weight of ester-type polyurethane of Example 18 was fed to two 8-nozzle spinning heads held at 200° C. The ester polyurethane was metered and pressurized by gear pumps mounted on the heads, passed through filters, then discharged from 0.7 mm diameter single-hole nozzles at a rate of 2 g/min into a 6 m long spinning chimney and taken up onto a cardboard bobbin at a speed of 600 m/min, thereby giving fiber having an average fiber diameter of 40 μm.

Comparative Example 12

Ester-Type Polyurethane (Film)

The ester-type polyurethane-containing solution prepared in Example 13 was cast onto a glass plate with a knife coater, then dried for 10 hours in a 60° C. vacuum dryer, thereby giving a film having a thickness of 100 μm.

Comparative Example 13

Ester-Type Polyurethane (Film)

The ester-type polyurethane-containing solution prepared in Example 14 was cast onto a glass plate with a knife coater, then dried for 10 hours in a 60° C. vacuum dryer, thereby giving a film having a thickness of 100 μm.

Comparative Example 14

Ester-Type Polyurethane (Film)

The ester-type polyurethane-containing solution prepared in Example 15 was cast onto a glass plate with a knife coater, then dried for 10 hours in a 60° C. vacuum dryer, thereby giving a film having a thickness of 100 μm.

Comparative Example 15

Ester-Type Polyurethane (Film)

The ester-type polyurethane-containing solution prepared in Example 16 was cast onto a glass plate with a knife coater, then dried for 10 hours in a 60° C. vacuum dryer, thereby giving a film having a thickness of 100 μm.

Comparative Example 16

Ester-Type Polyurethane (Film)

The ester-type polyurethane-containing solution prepared in Example 17 was cast onto a glass plate with a knife coater, then dried for 10 hours in a 60° C. vacuum dryer, thereby giving a film having a thickness of 100 μm.

Comparative Example 17

Ether-Type Polyurethane (Nanofiber)

Polytetramethylene glycol (number-average molecular weight, 1,950; PTMG 2000, available from Hodogaya Chemical Co., Ltd.), 69.4 parts by weight, was reacted with 25 parts by weight of MDI in a nitrogen gas-sealed system at 80° C. for 1 hour under stirring, following which 5.6 parts by weight of 1,4-butanediol, a low-molecular-weight diol, was also added, thereby giving an ether polyurethane.

This ether-type polyurethane was solid phase reacted for 5 days in a 40° C., 80% relative humidity room, following which 500 parts by weight of DMF was added and dissolution of the ether-type polyurethane was effected at 60° C., yielding 600 parts by weight of an ether-type polyurethane-containing solution.

Using this ether-type polyurethane-containing solution (spinning dope), electrostatic spinning was carried out under the same conditions as in Example 11, thereby giving a nanofiber nonwoven fabric.

The resulting nonwoven fabric had an average fiber diameter of 500 nm, and fibers with a diameter greater than 1 μm were not observed. The nonwoven fabric had a thickness of 100 μm and a basis weight of 15 g/m$^2$.

Bond Energy Ratio

From Table 1 above, at 25° C., the C—H bond energy is 416 kJ/mol, the C—C bond energy is 357 kJ/mol, the C=O bond energy is 804 kJ/mol, the C—N bond energy is 273 kJ/mol, the N—H bond energy is 391 kJ/mol, the C=C bond energy is 588 kJ/mol, and the C—O bond energy is 329 kJ/mol.

The total bond energy is thus 416×186+357×74+804×2+273×2+391+588×6+329×24=117,763 kJ/mol.

The electron-withdrawing group bond energy is 804×2+273×2+391+588×6+329×24=13,969 kJ/mol.

Therefore, the bond energy ratio is 13,969/117,763=0.12.

Comparative Example 18

Ether-Type Polyurethane (Film)

The ether-type polyurethane-containing solution prepared in Comparative Example 17 was cast onto a glass plate with a knife coater, then dried for 10 hours in a 60° C. vacuum dryer, thereby giving a film having a thickness of 100 μm.

Comparative Example 19

Ether-Type Polyurethane (Microfiber)

Aside from using polytetramethylene glycol (number-average molecular weight, 1,950; PTMG 2000, available from Hodogaya Chemical Co., Ltd.) instead of polyester diol, 851.4 parts by weight of an ether-type polyurethane-containing solution (solids content, 24 wt %) was obtained in the same way as in Example 12.

This ether-type polyurethane-containing solution was extruded from a 4-hole nozzle into a 220° C. inert gas, and the filaments were made to mutually cohere with a false-twisting device, then wound onto a cardboard bobbin at a speed of 600 m/min while having a finish applied thereto, thereby giving fibers with an average fiber diameter of 40 μm.

The bond energy ratio was the same as in Comparative Example 17.

Comparative Example 20

Ether-Type Polyurethane (Nanofiber)

Ninety parts by weight of the ether-type polyurethane-containing solution prepared in Comparative Example 17 and 510 parts by weight of DMF were mixed, and the ether-type polyurethane was dissolved at 60° C. to give 600 parts by weight of an ether-type polyurethane-containing solution (solids content, 15 wt %).

Using this ether polyurethane-containing solution (spinning dope), electrostatic spinning was carried out under the same conditions as in Example 11, thereby giving a nanofiber nonwoven fabric.

The resulting nonwoven fabric had an average fiber diameter of 300 nm, and fibers with a diameter greater than 1,000 nm were not observed. The nonwoven fabric had a thickness of 100 μm and a basis weight of 10 g/m².

Comparative Example 21

Polyacrylonitrile (Film)

The polyacrylonitrile-containing solution prepared in Example 21 was cast onto a glass plate with a knife coater, then dried for 10 hours in a 60° C. vacuum dryer, thereby giving a film having a thickness of 100 μm.

Comparative Example 22

Polyamideimide (Film)

The polyamideimide-containing solution prepared in Example 22 was cast onto a glass plate with a knife coater, then dried for 10 hours in a 60° C. vacuum dryer, thereby giving a film having a thickness of 100 μm.

Comparative Example 23

Polymerized Fatty Acid-type Polyamide (Nanofiber)

Forty parts by weight of a polymerized fatty acid-type polyamide (PA102A, produced by Fuji Kasei Kogyo Co., Ltd.) was dissolved at room temperature (25° C.) in 80 parts by weight of toluene and 80 parts by weight of methanol, thereby giving 200 parts by weight of a polymerized fatty acid-type polyamide-containing solution (solids content, 20 wt %).

This polymerized fatty acid-type polyamide-containing solution (spinning dope) was placed in a syringe and electrostatic spinning was carried out at a discharge tip orifice diameter of 0.4 mm and an applied voltage of 50 KV (at room temperature and atmospheric pressure), thereby giving a nanofiber nonwoven fabric. The resulting nonwoven fabric had an average fiber diameter of 800 nm, and fibers with a diameter greater than 5 μm were not observed.

The ratio $A_2/A_1$ of the peak height $A_2$ near 1640 cm$^{-1}$ to the peak height $A_1$ near 1550 cm$^{-1}$ in an infrared absorption spectrum of this fiber was 1.25.

Bond Energy Ratio

From Table 1 above, at 25° C., the C—H bond energy is 416 kJ/mol, the C—C bond energy is 357 kJ/mol, the C═O bond energy is 804 kJ/mol, the C—N bond energy is 273 kJ/mol, the N—H bond energy is 391 kJ/mol, and the C═C bond energy is 588 kJ/mol. The total bond energy is 416×68+357×37+804×2+273×2+391×2+588×2=45,609 kJ/mol.

The electron-withdrawing group bond energy is 804×2+273×2+391×2+588×2=4,112 kJ/mol.

Therefore, the bond energy ratio is 4,112/45,609=0.09.

Comparative Example 24

Polymerized Fatty Acid-Type Polyamide (Film)

The polymerized fatty acid-type polyamide-containing solution prepared in Comparative Example 23 was cast onto a glass plate with a knife coater, then dried for 10 hours in a 60° C. vacuum dryer, thereby giving a film having a thickness of 100 μm.

Comparative Example 25

Polyvinylidene Chloride (Film)

The polyvinylidene chloride-containing solution prepared in Example 23 was cast onto a glass plate with a knife coater, then dried for 10 hours in a 60° C. vacuum dryer, thereby giving a film having a thickness of 100 μm.

Comparative Example 26

Polystyrene (Film)

The polystyrene-containing solution prepared in Example 24 was cast onto a glass plate with a knife coater, then dried for 10 hours in a 60° C. vacuum dryer, thereby giving a film having a thickness of 100 μm.

The bond energy ratios, antibacterial test results, amount of surface functional groups and ratios thereof (fiber/film) for the fibers (nonwoven fabrics) and films produced in each of the above examples and comparative examples are shown collectively in Tables 2 and 3.

TABLE 2

| | | Average fiber diameter (nm) | Resin | Bond energy ratio | Antibacterial test* | | | Surface functional groups (Eq/g) | Surface functional group ratio (fiber/film) |
| | | | | | Number of live cells | Bacteriostatic activity | Bactericidal activity | | |
| --- | --- | --- | --- | --- | --- | --- | --- | --- | --- |
| Example | 1 | 500 | polylactic acid | 0.32 | <600 | 4.1 | 1.5 | 0.16 | 3.2 |
| | 2 | 250 | nylon 66 | 0.14 | <600 | 4.2 | 1.6 | 0.10 | 1.7 |
| | 3 | 300 | nylon 6 | 0.20 | <600 | 4.1 | 1.5 | 0.15 | 2.5 |
| | 4 | 300 | nylon 66 | 0.14 | <600 | 4.1 | 1.5 | 0.10 | 1.7 |
| | 5 | 100 | nylon 66 | 0.14 | <600 | 4.1 | 1.5 | 0.15 | 2.5 |
| | 6 | 80 | nylon 66 | 0.14 | <600 | 4.1 | 1.5 | 0.18 | 3.0 |

TABLE 2-continued

| | | Average fiber diameter (nm) | Resin | Bond energy ratio | Antibacterial test* Number of live cells | Bacteriostatic activity | Bactericidal activity | Surface functional groups (Eq/g) | Surface functional group ratio (fiber/film) |
|---|---|---|---|---|---|---|---|---|---|
| | 7 | 250 | nylon 6 | 0.20 | <600 | 4.1 | 1.5 | 0.15 | 2.5 |
| | 8 | 300 | nylon 9T | 0.26 | <600 | 4.1 | 1.5 | 0.23 | 2.9 |
| | 9 | 300 | nylon 610 | 0.13 | <600 | 4.1 | 1.5 | 0.09 | 1.5 |
| | 10 | 200 | aromatic amide | 0.51 | <600 | 4.1 | 1.5 | 0.06 | 3.0 |
| | 11 | 500 | ester-type PU | 0.28 | $8.1 \times 10^3$ | 3.2 | 0.6 | 0.11 | 1.4 |
| | 12 | 300 | ester-type PU | 0.28 | $2.1 \times 10^3$ | 3.8 | 1.2 | 0.11 | 1.4 |
| | 13 | 300 | ester-type PU | 0.26 | $2.1 \times 10^3$ | 4.1 | 1.5 | 0.11 | 1.4 |
| | 14 | 300 | ester-type PU | 0.23 | $2.1 \times 10^3$ | 3.8 | 1.2 | 0.10 | 1.4 |
| | 15 | 300 | ester-type PU | 0.47 | $2.1 \times 10^3$ | 3.8 | 1.2 | 0.26 | 2.6 |
| | 16 | 150 | ester-type PU | 0.18 | <600 | 3.8 | 1.2 | 0.10 | 1.4 |
| | 17 | 150 | ester-type PU | 0.26 | <600 | 3.8 | 1.2 | 0.11 | 1.6 |
| | 18 | 550 | ester-type PU | 0.28 | $8.1 \times 10^3$ | 3.2 | 0.6 | 0.11 | 1.4 |
| | 19 | 300 | ester-type PU | 0.28 | $2.1 \times 10^3$ | 4.1 | 1.5 | 0.11 | 1.4 |
| | 20 | 500 | ether-type PU | 0.34 | $1.3 \times 10^4$ | 2.8 | 0.1 | 0.009 | 3.0 |
| | 21 | 100 | polyacrylonitrile | 0.29 | <600 | 4.1 | 1.5 | 0.028 | 4.0 |
| | 22 | 800 | polyamideimide | 0.51 | <600 | 4.1 | 1.5 | 0.15 | 3.0 |
| | 23 | 800 | vinylidene chloride | 0.35 | <600 | 4.1 | 1.5 | 0.021 | 7.0 |
| | 24 | 800 | polystyrene | 0.26 | <600 | 4.1 | 1.5 | — | — |

*Standard cloth (cotton)
Immediately after inoculation: $1.9 \times 10^4$
After 18 hours of culturing: $7.9 \times 10^6$

TABLE 3

| | | Average fiber diameter (nm) | Resin | Bond energy ratio | Antibacterial test* Number of live cells | Bacteriostatic activity | Bactericidal activity | Surface functional groups (Eq/g) | Surface functional group ratio (fiber/film) |
|---|---|---|---|---|---|---|---|---|---|
| Comparative Example | 1 | film | polylactic acid | 0.32 | $4.5 \times 10^7$ | −0.3 | −2.9 | 0.05 | — |
| | 2 | 70000 | polylactic acid | 0.32 | $4.5 \times 10^6$ | 0.2 | −2.3 | 0.04 | 0.8 |
| | 3 | film | nylon 66 | 0.14 | $7.5 \times 10^7$ | −0.3 | −2.8 | 0.06 | — |
| | 4 | film | nylon 6 | 0.20 | $7.4 \times 10^7$ | −0.3 | −2.5 | 0.06 | — |
| | 5 | 1500 | nylon 6 | 0.20 | $2.5 \times 10^7$ | −0.3 | −2.0 | 0.03 | 0.5 |
| | 6 | 1500 | nylon 66 | 0.14 | $2.2 \times 10^7$ | −0.2 | −1.9 | 0.03 | 0.5 |
| | 7 | film | nylon 9T | 0.26 | $3.5 \times 10^7$ | −0.2 | −2.0 | 0.08 | — |
| | 8 | film | nylon 610 | 0.13 | $7.5 \times 10^7$ | −0.3 | −2.6 | 0.06 | — |
| | 9 | 10000 | aromatic amide | 0.51 | $4.5 \times 10^5$ | −0.3 | −2.1 | 0.02 | — |
| | 10 | film | ester-type PU | 0.28 | $5.7 \times 10^7$ | −0.2 | −2.6 | 0.08 | — |
| | 11 | 40000 | ester-type PU | 0.28 | $1.8 \times 10^7$ | −0.1 | −1.9 | 0.07 | 0.9 |
| | 12 | film | ester-type PU | 0.26 | $5.9 \times 10^7$ | −0.3 | −2.8 | 0.08 | — |
| | 13 | film | ester-type PU | 0.23 | $6.7 \times 10^7$ | −0.2 | −2.0 | 0.07 | — |
| | 14 | film | ester-type PU | 0.47 | $4.7 \times 10^7$ | −0.1 | −1.9 | 0.10 | — |
| | 15 | film | ester-type PU | 0.18 | $7.5 \times 10^7$ | −0.1 | −1.9 | 0.07 | — |
| | 16 | film | ester-type PU | 0.26 | $5.7 \times 10^7$ | −0.2 | −2.6 | 0.07 | — |
| | 17 | 500 | ether-type PU | 0.12 | $4.2 \times 10^5$ | 1.3 | −1.4 | 0.001 | 0.3 |
| | 18 | film | ether-type PU | 0.12 | $6.2 \times 10^7$ | −0.3 | −2.0 | 0.003 | — |
| | 19 | 40000 | ether-type PU | 0.12 | $2.2 \times 10^7$ | −0.2 | −1.9 | 0.002 | 0.7 |
| | 20 | 300 | ether-type PU | 0.12 | $4.2 \times 10^5$ | 1.3 | −1.4 | 0.001 | 0.3 |
| | 21 | film | polyacrylonitrile | 0.29 | $7.2 \times 10^7$ | −0.3 | −1.8 | 0.007 | — |
| | 22 | film | polyamideimide | 0.51 | $7.4 \times 10^7$ | −0.3 | −2.6 | 0.05 | — |
| | 23 | 800 | Polymerized fatty acid-type polyamide | 0.09 | $1.7 \times 10^6$ | 0.7 | −2.0 | 0.002 | 1.0 |
| | 24 | film | Polymerized fatty acid-type polyamide | 0.09 | $6.8 \times 10^7$ | −0.3 | −2.6 | 0.002 | — |
| | 25 | film | vinylidene chloride | 0.35 | $7.0 \times 10^7$ | −0.3 | −1.8 | 0.003 | — |
| | 26 | film | polystyrene | 0.26 | $7.5 \times 10^7$ | −0.3 | −2.5 | — | — |

*Standard cloth (cotton)
Immediately after inoculation: $1.9 \times 10^4$
After 18 hours of culturing: $7.9 \times 10^6$ As shown in Table 2, because the nonwoven fabrics obtained in Examples 1 to 24 of the invention were made of nanofibers and the starting polymers had bond energy ratios of 0.13 or more, these nonwoven fabrics all had excellent antibacterial properties.

By contrast, as shown in Table 3, even when the starting polymers had bond energy ratios of 0.13 or more, the films (Comparative Examples 1, 3, 4, 7, 8, 10, 12 to 16, 21, 22, and 24 to 26) and microfiber nonwoven fabrics (Comparative Examples 2, 5, 6, 9, and 11) did not exhibit antibacterial properties.

Moreover, even in the case of nanofiber nonwoven fabrics, when the bond energy ratio was less than 0.13 (Comparative Examples 17, 20 and 23), antibacterial properties were not exhibited.

The invention claimed is:

1. A method of imparting an antibacterial activity to a nanofiber without the addition of an antibacterial agent, comprising:
    spinning a polymer possessing electron-withdrawing groups and/or electron-withdrawing atomic groups, wherein the polymer is a polyester resin, a polyamide resin, a polyurethane resin, or a polyamideimide resin, and has a ratio of the bond energy at 25° C. of electron-withdrawing groups and/or electron-withdrawing atomic groups present in a smallest unit of the polymer to the bond energy at 25° C. of the smallest unit of the polymer of at least 0.13, and
    obtaining a nanofiber having an average fiber diameter of at least 1 nm but less than 1,000 nm,
    said nanofiber itself exhibiting an antibacterial activity.

2. The method of claim 1 wherein, in surface functional group measurement using an acid-base titration method, the ratio of functional groups in a specific weight of the nanofiber to functional groups in a film of the same weight that is formed of the polymer is at least 1.3.

3. The method of claim 1 or 2 wherein the nanofiber is composed solely of the polymer having electron-withdrawing groups and/or electron-withdrawing atomic groups.

4. The method of claim 1, wherein the polymer is a water-insoluble polymer.

5. The method of claim 1, wherein the polyurethane resin is an ester-type polyurethane resin.

6. The method of claim 5, wherein the average fiber diameter is from 1 to 300 nm.

7. The method of claim 1 wherein the polyamide resin has, in an infrared absorption spectrum thereof, a ratio $A_2/A_1$ between the height $A_1$ of a peak near $1550\,cm^{-1}$ and the height $A_2$ of a peak near $1640\,cm^{-1}$ of from 1.2 to 1.8.

8. The method of claim 7 wherein the ratio $A_2/A_1$ is from 1.3 to 1.6.

9. The method of claim 1 wherein the spinning process is electrostatic spinning.

10. The method of claim 7 wherein the nanofiber is obtained by electrostatically spinning a solution prepared by dissolving the polyamide resin in formic acid.

* * * * *